US010468202B2

(12) United States Patent
Deng et al.

(10) Patent No.: US 10,468,202 B2
(45) Date of Patent: Nov. 5, 2019

(54) CONDUCTIVE PAPER ELECTRODE, ELECTROCHEMICAL CAPACITOR AND METHOD FOR MANUFACTURING THE SAME

(71) Applicant: NATIONAL SYNCHROTRON RADIATION RESEARCH CENTER, Hsinchu (TW)

(72) Inventors: Ming-Jay Deng, Hsinchu (TW); Kueih-Tzu Lu, Hsinchu (TW); Jin-Ming Chen, Hsinchu (TW)

(73) Assignee: NATIONAL SYNCHROTRON RADIATION RESEARCH CENTER, Hsinchu (TW)

( * ) Notice: Subject to any disclaimer, the term of this patent is extended or adjusted under 35 U.S.C. 154(b) by 3 days.

(21) Appl. No.: 15/438,033

(22) Filed: Feb. 21, 2017

(65) Prior Publication Data

US 2018/0240608 A1    Aug. 23, 2018

(51) Int. Cl.
| | |
|---|---|
| *H01G 11/32* | (2013.01) |
| *H01G 11/36* | (2013.01) |
| *H01G 11/56* | (2013.01) |
| *H01G 11/58* | (2013.01) |
| *H01G 11/60* | (2013.01) |
| *H01G 11/62* | (2013.01) |
| *H01G 11/64* | (2013.01) |

(Continued)

(52) U.S. Cl.
CPC ............ *H01G 11/36* (2013.01); *H01G 11/26* (2013.01); *H01G 11/38* (2013.01); *H01G 11/46* (2013.01); *H01G 11/48* (2013.01); *H01G 11/56* (2013.01); *H01G 11/86* (2013.01); *H01G 11/62* (2013.01); *Y02E 60/13* (2013.01)

(58) Field of Classification Search
CPC ........ H01G 11/36; H01G 11/52; H01G 11/54; H01G 11/56; H01G 11/58; H01G 11/32; H01G 11/60; H01G 11/62; H01G 11/64
USPC ................ 361/502, 523, 532, 503, 504, 526
See application file for complete search history.

(56) References Cited

U.S. PATENT DOCUMENTS 9,017,756 B2    4/2015 Zhamu et al.
9,138,965 B2    9/2015 Hu et al.
(Continued)

FOREIGN PATENT DOCUMENTS

JP    10-188951      7/1998
JP    H10188951 A   7/1998
(Continued)

OTHER PUBLICATIONS

Simon, P.; Gogotsi, Y. Materials for Electrochemical Capacitors. Nat. Mater. 2008, 7, 845-854.
(Continued)

*Primary Examiner* — Eric W Thomas
*Assistant Examiner* — Arun Ramaswamy
(74) *Attorney, Agent, or Firm* — Muncy, Geissler, Olds & Lowe, PC

(57) ABSTRACT

A conductive paper electrode includes a paper, a carbon powder layer, a graphite layer and a nanostructural layer. The carbon powder layer is positioned over the paper. The graphite layer is positioned over the carbon powder layer. The nanostructural layer is positioned over the graphite layer. An electrochemical capacitor includes two conductive paper electrodes and an electrolyte interposed therebetween.

16 Claims, 24 Drawing Sheets

(51) Int. Cl.
H01G 11/26 (2013.01)
H01G 11/46 (2013.01)
H01G 11/48 (2013.01)
H01G 11/86 (2013.01)
H01G 11/38 (2013.01)

(56) References Cited

U.S. PATENT DOCUMENTS

| | | | |
|---|---|---|---|
| 9,428,680 B2 | 8/2016 | Zambova | |
| 9,441,086 B2 | 9/2016 | Albaugh et al. | |
| 9,447,308 B2 | 9/2016 | Albaugh et al. | |
| 2011/0204020 A1* | 8/2011 | Ray | B82Y 25/00 216/13 |
| 2013/0163145 A1* | 6/2013 | Deng | H01G 11/06 361/502 |
| 2014/0342244 A1* | 11/2014 | West | H01M 10/0569 429/333 |
| 2015/0098167 A1* | 4/2015 | El-Kady | H01G 11/24 361/502 |

FOREIGN PATENT DOCUMENTS

| | | |
|---|---|---|
| JP | 2006-164810 A | 6/2006 |
| JP | 2008126469 A | 6/2008 |
| JP | 2011151279 A | 8/2011 |
| JP | 2013230653 A | 11/2013 |
| JP | 2013235097 A | 11/2013 |
| JP | 2014-93412 A | 5/2014 |
| JP | 2014093412 A | 5/2014 |
| JP | 2016-21593 A | 2/2016 |
| JP | 20160181931 A | 5/2016 |
| JP | 2016-532294 A | 10/2016 |
| JP | 2016532294 A | 10/2016 |
| JP | 2017-504952 A | 2/2017 |
| JP | WO2015025792 A1 | 3/2017 |
| JP | 2017535036 A | 11/2017 |
| JP | 2018513541 A | 5/2018 |
| TW | I537996 B | 6/2016 |
| WO | WO2016/068534 A1 | 5/2016 |
| WO | WO2017/011052 A2 | 1/2017 |

OTHER PUBLICATIONS

Miller, J. R.; Simon, P. Electrochemical Capacitors for Energy Management. Science 2008, 321, 651-652.
Li, L.; Wu, Z.; Yuan, S.; Zhang, X.-B. Advances and Challenges for Flexible Energy Storage and Conversion Devices and Systems. Energy Environ. Sci. 2014, 7, 2101-2122.
Jiang, J.; Li, Y.; Liu, J.; Huang, X.; Yuan, C.; Lou, X. W. Recent Advances in Metal Oxide-based Electrode Architecture Design for Electrochemical Energy Storage. Adv. Mater. 2012, 24, 5166-5180.
Rakhi, R. B.; Chen, W.; Cha, D.; Alshareef, H. N. Substrate Dependent Self-Organization of Mesoporous Cobalt Oxide Nanowires with Remarkable Pseudocapacitance. Nano Lett. 2012, 12, 2559-2567.
Cheng, Y.; Lu, S.; Zhang, H.; Varanasi, C. V.; Liu, J. Synergistic Effects from Graphene and Carbon Nanotubes Enable Flexible and Robust Electrodes for High-Performance Supercapacitors. Nano Lett. 2012, 12, 4206-4211.
Ji, H.; Zhang, L.; Pettes, M. T.; Li, H.; Chen, S.; Shi, L.; Piner, R.; Ruoff, R. S. Ultrathin Graphite Foam: A Three-Dimensional Conductive Network for Battery Electrodes. Nano Lett. 2012, 12, 2446-2451.
Peng, L.; Peng, X.; Liu, B.; Wu, C.; Xie, Y.; Yu, G. Ultrathin Twodimensional MnO2/ graphene Hybrid Nanostructures for Highperformance, Flexible Planar Supercapacitors. Nano Lett. 2013, 13, 2151-2157.
Liu, L.; Niu, Z.; Zhang, L.; Zhou, W.; Chen, X.; Xie, S. Nanostructured Graphene Composite Papers for Highly Flexible and Foldable Supercapacitors. Adv. Mater. 2014, 26, 4855-4862.

Nyholm, L.; Nyström, G.; Mihranyan, A.; Strømme, M. Toward Flexible Polymer and Paper-Based Energy Storage Devices. Adv. Mater. 2011, 23, 3751-3769.
Kim, S.-K.; Koo, H.-J.; Lee, A.; Braun, P. V. Selective Wetting-Induced Micro-Electrode Patterning for Flexible Micro-Supercapacitors. Adv. Mater. 2014, 26, 5108-5112.
Choi, C.; Lee, J. A.; Choi, A. Y.; Kim, Y. T.; Lepro, X.; Lima, M. D.; Baughman, R. H.; Kim, S. J. Flexible Supercapacitor Made of Carbon Nanotube Yarn with Internal Pores. Adv. Mater. 2014, 26, 2059-2065.
Ren, J.; Li, L.; Chen, C.; Chen, X.; Cai, Z.; Qiu, L.; Wang, Y.; Zhu, X.; Peng, H. Twisting Carbon Nanotube Fibers for Both Wire-Shaped Micro-Supercapacitor and Micro-Battery. Adv. Mater. 2013, 25, 1155-1159.
Ren, J.; Bai, W.; Guan, G.; Zhang, Y.; Peng, H. Flexible and Weaveable Capacitor Wire Based on a Carbon Nanocomposite Fiber. Adv. Mater. 2013, 25, 5965-5970.
Yang, Z.; Deng, J.; Chen, X.; Ren, J.; Peng, H. A Highly Stretchable, Fiber-Shaped Supercapacitor. Angew. Chem., Int. Ed. 2013, 52, 13453-13457.
Yuan, L.; Xiao, X.; Ding, T.; Zhong, J.; Zhang, X.; Shen, Y.; Hu, B.; Huang, Y.; Zhou, J.; Wang, Z. L. Paper-Based Supercapacitors for Self-Powered Nanosystems. Angew. Chem. 2012, 124, 5018-5022.
Wang, X. F.; Lu, X.; Liu, B.; Chen, D.; Tong, Y.; Shen, G. Flexible Energy-Storage Devices: Design Consideration and Recent Progress. Adv. Mater. 2014, 26, 4763-4782.
Zhang, M.; Zhou, Q.; Chen, J.; Yu, X.; Huang, L.; Li, Y.; Li, C.; Shi, G. An Ultrahigh-Rate Electrochemical Capacitor Based on Solution-Processed Highly Conductive PEDOT:PSS Films for AC Line-Filtering. Energy Environ. Sci. 2016, 9, 2005-2010.
Hu, L.; Cui, Y. Energy and Environmental Nanotechnology in Conductive Paper and Textiles. Energy Environ. Sci. 2012, 5, 6423-6435.
Zheng, G.; Hu, L.; Wu, H.; Xie, X.; Cui, Y. Paper Supercapacitors by a Solvent-Free Drawing Method. Energy Environ. Sci. 2011, 4, 3368-3373.
Feng, J. X.; Ye, S. H.; Lu, X. F.; Tong, Y. X.; Li, G. R. Asymmetric Paper Supercapacitor Based on Amorphous Porous Mn3O4 Negative Electrode and Ni(OH)2 Positive Electrode: A Novel and High-Performance Flexible Electrochemical Energy Storage Device. ACS Appl. Mater. Interfaces 2015, 7, 11444-11451.
Dai, H. Carbon Nanotubes: Synthesis, Integration, and Properties. Acc. Chem. Res. 2002, 35, 1035-1044.
Lu, X.; Zeng, Y.; Yu, M.; Zhai, T.; Liang, C.; Xie, S.; Balogun, M. S.; Tong, Y. Oxygen-Deficient Hematite Nanorods as High-Performance and Novel Negative Electrodes for Flexible Asymmetric Supercapacitors. Adv. Mater. 2014, 26, 3148-3155.
Zhang, D.; Miao, M.; Niu, H.; Wei, Z. Core-Spun Carbon Nanotube Yarn Supercapacitors for Wearable Electronic Textiles. ACS Nano 2014, 8, 4571-4579.
Armand, M.; Endres, F.; MacFarlane, D. R.; Ohno, H.; Scrosati, B. Ionic-Liquid Materials for the Electrochemical Challenges of the Future. Nat. Mater. 2009, 8, 621-629.
Zhong, C.; Deng, Y.; Hu, W.; Qiao, J.; Zhang, L.; Zhang, J. A Review of Electrolyte Materials and Compositions for Electrochemical Supercapacitors. Chem. Soc. Rev. 2015, 44, 7484-7539.
Deng, M. J.; Chang, J. K.; Wang, C. C.; Chen, K. W.; Lin, C. M.; Tang, M. T.; Chen, J. M.; Lu, K. T. High-Performance Electrochemical Pseudo-capacitor Based on MnO2 Nanowires/Ni Foam as Electrode with a Novel Li-ion Quasi-Ionic Liquid as Electrolyte. Energy Environ. Sci. 2011, 4, 3942-3946.
Yang, C. H.; Sun, I. W.; Hsieh, C. T.; Wu, T. Y.; Su, C. Y.; Li, Y. S.; Chang, J. K. Facile Electrochemical Preparation of Hierarchical Porous Structures to Enhance Manganese Oxide Charge-Storage Properties in Ionic Liquid Electrolytes. J. Mater. Chem. A 2016, 4, 4015-4018.
Wang, G.; Lu, X.; Ling, Y.; Zhai, T.; Wang, H.; Tong, Y.; Li, Y. LiCl/PVA Gel Electrolyte Stabilizes Vanadium Oxide Nanowire Electrodes for Pseudocapacitors. ACS Nano 2012, 6, 10296-10303.
Dong, L.; Xu, C.; Li, Y.; Huang, Z. H.; Kang, F. Q.; Yang, H.; Zhao, X. Flexible Electrodes and Supercapacitors for Wearable Energy Storage: A Review by Category. J. Mater. Chem. A 2016, 4, 4659-4685.

(56) References Cited

OTHER PUBLICATIONS

Li, Q.; Wang, Z.; Li, G. R.; Guo, R.; Ding, L.; Tong, Y. Design and Synthesis of MnO2/Mn/MnO2 Sandwich-Structured Nanotube Arrays with High Supercapacitive Performance for Electrochemical Energy Storage. Nano Lett. 2012, 12, 3803-3807.

Lu, X.; Zhai, T.; Zhang, X.; Shen, Y.; Yuan, L.; Hu, B.; Gong, L.; Chen, J.; Gao, Y.; Zhou, J.; Tong, Y.; Wang, Z. L. WO3-x@Au@MnO2 Core-Shell Nanowires on Carbon Fabric for High-Performance Flexible Supercapacitors. Adv. Mater. 2012, 24, 938-944.

Yu, G.; Hu, L.; Liu, N.; Wang, H.; Vosgueritchian, M.; Yang, Y.; Cui, Y.; Bao, Z. Enhancing the Supercapacitor Performance of Graphene/MnO2 Nanostructured Electrodes by Conductive Wrapping. Nano Lett. 2011, 11, 4438-4442.

Deng, M. J.; Wang, C. C.; Ho, P. J.; Lin, C. M.; Chen, J. M.; Lu, K. T. Facile Electrochemical Synthesis of 3D Nano-architectured CuO Electrodes for High-Performance Supercapacitors. J. Mater. Chem. A 2014, 2, 12857-12865.

Dong, C.; Wang, Y.; Xu, J.; Cheng, G.; Yang, W.; Kou, T.; Zhang, Z.; Ding, Y. 3D Binder-Free Cu2O@Cu Nanoneedle Arrays for High-Performance Asymmetric Supercapacitors. J. Mater. Chem. A 2014, 2, 18229-18235.

Liu, C.; Yu, Z.; Neff, D.; Zhamu, A.; Jang, B. Z. Graphene-Based Supercapacitor with an Ultrahigh Energy Density. Nano Lett. 2010, 10, 4863-4868.

Yu, M. H.; Zhai, T.; Lu, X. H.; Chen, X. J.; Xie, S. L.; Li, W.; Liang, C. L.; Zhao, W. X.; Zhang, L. P.; Tong, Y. X. Manganese Dioxide Nanorod Arrays on Carbon Fabric for Flexible Solid-State Supercapacitors. J. Power Sources 2013, 239, 64-71.

Zhu, H.; Wang, X.; Liu, X.; Yang, X. Integrated Synthesis of Poly(o-phenylenediamine)-Derived Carbon Materials for High Performance Supercapacitors. Adv. Mater. 2012, 24, 6524-6529.

Tang, P.; Han, L.; Zhang, L. Facile Synthesis of Graphite/PEDOT/MnO2 Composites on Commercial Supercapacitor Separator Membranes as Flexible and High-Performance Supercapacitor Electrodes. ACS Appl. Mater. Interfaces 2014, 6, 10506-10515.

Belli, M.; Scafati, A.; Bianconi, A.; Mobilio, S.; Palladino, L.; Reale, A.; Burattini, E. X-Ray Absorption Near Edge Structures (XANES) in Simple and Complex Mn Compounds. Solid State Commun. 1980, 35, 355-361.

Chang, J. K.; Lee, M. T.; Tsai, W. T.; Deng, M. J.; Sun, I. W. XRay Photoelectron Spectroscopy and In Situ X-ray Absorption Spectroscopy Studies on Reversible Insertion/Desertion of Dicyanamide Anions into/from Manganese Oxide in Ionic Liquid. Chem. Mater. 2009, 21, 2688-2695.

Wang, D. W.; Li, F.; Liu, M.; Lu, G. Q.; Cheng, H. M. 3D Aperiodic Hierarchical Porous Graphitic Carbon Material for High-Rate Electrochemical Capacitive Energy Storage. Angew. Chem., Int. Ed. 2008, 47, 373-376.

Wu, Z. S.; Ren, W.; Wang, D. W.; Li, F.; Liu, B.; Cheng, H. M. High-Energy MnO2 Nanowire/Graphene and Graphene Asymmetric Electrochemical Capacitors. ACS Nano 2010, 4, 5835-5842.

Kim, J. H.; Lee, K. H.; Overzet, L. J.; Lee, G. S. Synthesis and Electrochemical Properties of Spin-Capable Carbon Nanotube Sheet/MnOx Composites for High-Performance Energy Storage Devices. Nano Lett. 2011, 11, 2611-2617.

Choi, B. G.; Yang, M.; Jung, S. C.; Lee, K. G.; Kim, J. G.; Park, H.; Park, T. J.; Lee, S. B.; Han, Y. K.; Huh, Y. S. Enhanced Pseudocapacitance of Ionic Liquid/Cobalt Hydroxide Nanohybrids. ACS Nano 2013, 7, 2453-2460.

Li, H. B.; Yu, M. H.; Wang, F. X.; Liu, P.; Liang, Y.; Xiao, J.; Wang, C. X.; Tong, Y. X.; Yang, G. W. Amorphous Nickel Hydroxide Nanospheres with Ultrahigh Capacitance and Energy Density as Electrochemical Pseudocapacitor Materials. Nat. Commun. 2013, 4, 1894-1900.

Xiong, X.; Ding, D.; Chen, D.; Waller, G.; Bu, Y.; Wang, Z.; Liu, M. Three-Dimensional Ultrathin Ni(OH)2 Nanosheets Grown on Nickel Foam for High-Performance Supercapacitors. Nano Energy 2015, 11, 154-161.

Chen, H.; Hu, L.; Chen, M.; Yan, Y.; Wu, L. Nickel-Cobalt Layered Double Hydroxide Nanosheets for High-Performance Supercapacitor Electrode Materials. Adv. Funct. Mater. 2013, pp. 1-9.

Deng, M. J.; Chen, K. W.; Che, Y. C.; Wang, I. J.; Lin, C. M.; Chen, J. M.; Lu, K. T.; Liao, Y. F.; Ishii H. Cheap, High-Performance, and Wearable Mn Oxide Supercapacitors with Urea-LiClO4 Based Gel Electrolytes. ACS Appl. Mater. Interfaces 2017, 9 (1), pp. 479-486.

Japanese Office Action Based on Application No. 2017-093283 dated Dec. 4, 2018.

* cited by examiner

CONDUCTIVE PAPER ELECTRODE, ELECTROCHEMICAL CAPACITOR AND METHOD FOR MANUFACTURING THE SAME

TECHNICAL FIELD

The present disclosure relates to a conductive paper electrode, an electrochemical capacitor and method for manufacturing the same, and more particularly, to a flexible conductive paper electrode, a flexible electrochemical capacitor and method for manufacturing the same.

DISCUSSION OF THE BACKGROUND

Lightweight, wearable and flexible supercapacitors (SCs) have generated acute interest for energy storage use due to their potential applications in wearable/roll-up display, electronic paper, mobile phone, sensor networks, hand-held portable devices and artificial electronic skin. SCs provide energy density greater than that of a conventional capacitor, with faster charge/discharge rates and a cycle life longer than that of batteries. A free-standing and binder-free electrode with robust mechanical strength and large capacitance is a vital factor for flexible SCs. As some of the most promising devices for energy storage, solid-state SCs have attracted intensive research interest because of their outstanding properties such as great safety, great flexibility, ultra-thin profile, high power density, light weight, and reduced environmental footprint, all of which offers great promise in the field of lightweight, portable, roll-up electronics. Solid-state SCs enable an entire device to be flexible, lightweight, thin, and compact, but, to fill the increasing energy demands for the next-generation portable electronic devices, the energy density of solid-state SCs must be further improved within confined areas or spaces. Conductive paper electrodes have attracted much interest for the development of planar wearable SCs. Cellulose paper is a general type of cheap and abundant material having outstanding flexibility. The porous and natural rough surfaces of paper are perfect for energy-storage devices, in which high surface roughness is advantageous for the handling of ions and electrons. Paper is an insulator, however, which presents limitations. To improve the conductivity of paper, carbon nanotubes can be coated on the surface of the paper with a solution-based method, but such method requires environmentally destructive chemicals and complicated processes, and carbon nanotubes remain prohibitively expensive.

This Discussion of the Background section is provided for background information only. The statements in this Discussion of the Background are not an admission that the subject matter disclosed in this Discussion of the Background section constitutes prior art to the present disclosure, and no conductive paper electrodes, electrochemical capacitors, or manufacturing methods described in this Discussion of the Background section may be used as an admission that any conductive paper electrode, electrochemical capacitor or manufacturing method of this application, including the conductive paper electrode, electrochemical capacitor and manufacturing method described in this Discussion of the Background section, constitutes prior art to the present disclosure.

SUMMARY

One aspect of the present disclosure provides a conductive paper electrode, an electrochemical capacitor and method for manufacturing the same.

A conductive paper electrode according to some embodiments of the present disclosure includes a paper, a carbon powder layer, a graphite layer and a nanostructural layer. The carbon powder layer is positioned over the paper. The graphite layer is positioned over the carbon powder layer. The nanostructural layer is positioned over the graphite layer.

In some embodiments, the carbon powder layer includes a photo-printed carbon powder layer.

In some embodiments, the graphite layer includes a textured surface.

In some embodiments, the nanostructural layer includes a plurality of conductive nanotubes.

In some embodiments, the nanostructural layer includes a nickel layer.

In some embodiments, the conductive paper electrode of further includes an energy storage layer over the nanostructural layer.

In some embodiments, a material of the energy storage layer comprises a metal oxide or a conductive polymer.

In some embodiments, the metal oxide includes manganese oxide, cobalt oxide, nickel oxide, vanadium oxide, or a combination thereof.

In some embodiments, the conductive polymer comprises Polypyrrole (PPy), Poly(3,4-ethylenedioxythiophene) (PEDOT), Polyaniline (PANI), or a combination thereof.

In some embodiments, the conductive paper electrode is flexible.

An electrochemical capacitor according to some embodiments of the present disclosure includes two aforementioned conductive paper electrodes and an electrolyte. Each of the conductive paper electrodes further includes an energy storage layer over the conductive nanostructures. The electrolyte is interposed between the energy storage layers of the conductive paper electrodes.

In some embodiments, the electrolyte includes a lithium-containing quasi-ionic liquid and a gel, where the lithium-containing quasi-ionic liquid comprises (a) an organic compound having at least one acylamino group, and (b) a lithium salt.

In some embodiments, the organic compound comprises acetamide, urea, methylurea (NMU), 2-oxazolidinone (OZO), ethyleneurea, 1,3-dimethylurea DMU or a combination thereof, the lithium salt is characterized as LiX, wherein X comprises $ClO_4^-$, $SCN^-$, $PF_6^-$, $B(C_2O_4)_2^-$, $N(SO_2CF_3)_2^-$, $CF_3SO_3^-$ or a combination thereof, and the gel comprises polyvinyl alcohol (PVA).

In some embodiments, a weight ratio of the lithium-containing quasi-ionic liquid to the gel is between about 1:4.5 and about 4:1.

A method for manufacturing a conductive paper electrode according to some embodiments of the present disclosure includes the following steps: First, a paper is provided. Next, a carbon powder layer is formed over the paper. A graphite layer is then formed over the carbon powder layer, and subsequently a nanostructural layer is formed over the graphite layer.

In some embodiments, the carbon powder layer is photo-printed over the paper.

In some embodiments, the graphite layer is drawn on the carbon powder layer with a graphite-containing tool.

In some embodiments, the graphite layer is drawn on the surface of the carbon powder layer uni-directionally.

In some embodiments, an energy storage layer is further formed over the nanostructural layer.

In some embodiments, a material of the energy storage layer comprises a metal oxide or a conductive polymer.

The conductive paper electrode is advantageous due to its thin profile, light weight, and high conductivity and flexibility. The electrochemical capacitor shows a great Csp, a high energy density, a high voltage, a high flexibility and excellent cycle-stability.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes as those of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures, and:

DETAILED DESCRIPTION

The following description of the disclosure accompanies drawings, which are incorporated in and constitute a conductive paper electrode, an electrochemical capacitor and a manufacturing method of this specification, and illustrate embodiments of the disclosure, but the disclosure is not limited to the embodiments. In addition, the following embodiments can be properly integrated to complete another embodiment.

References to "one embodiment," "an embodiment," "exemplary embodiment," "some embodiments," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

The present disclosure is directed to a conductive paper electrode including a paper mainly made of cellulose fibers, a carbon powder layer, a graphite layer and a nanostructural layer. The carbon powder layer can be formed on the paper in a photo-printing manner. The graphite layer can be drawn on the carbon powder layer by a graphite pencil core. The nanostructural layer can be formed on the graphite layer by plating. The conductive paper electrode maintains its conductivity when folded, twisted or bent at various angles. The present disclosure is further directed to an electrochemical capacitor including two conductive paper electrodes and an electrolyte interposed therebetween. The conductive paper electrodes and the electrolyte can be folded, twisted or bent at various angles. The following description is also directed to a method for manufacturing a conductive paper electrode, as discussed below.

In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, and is defined by the claims.

Figure 1:
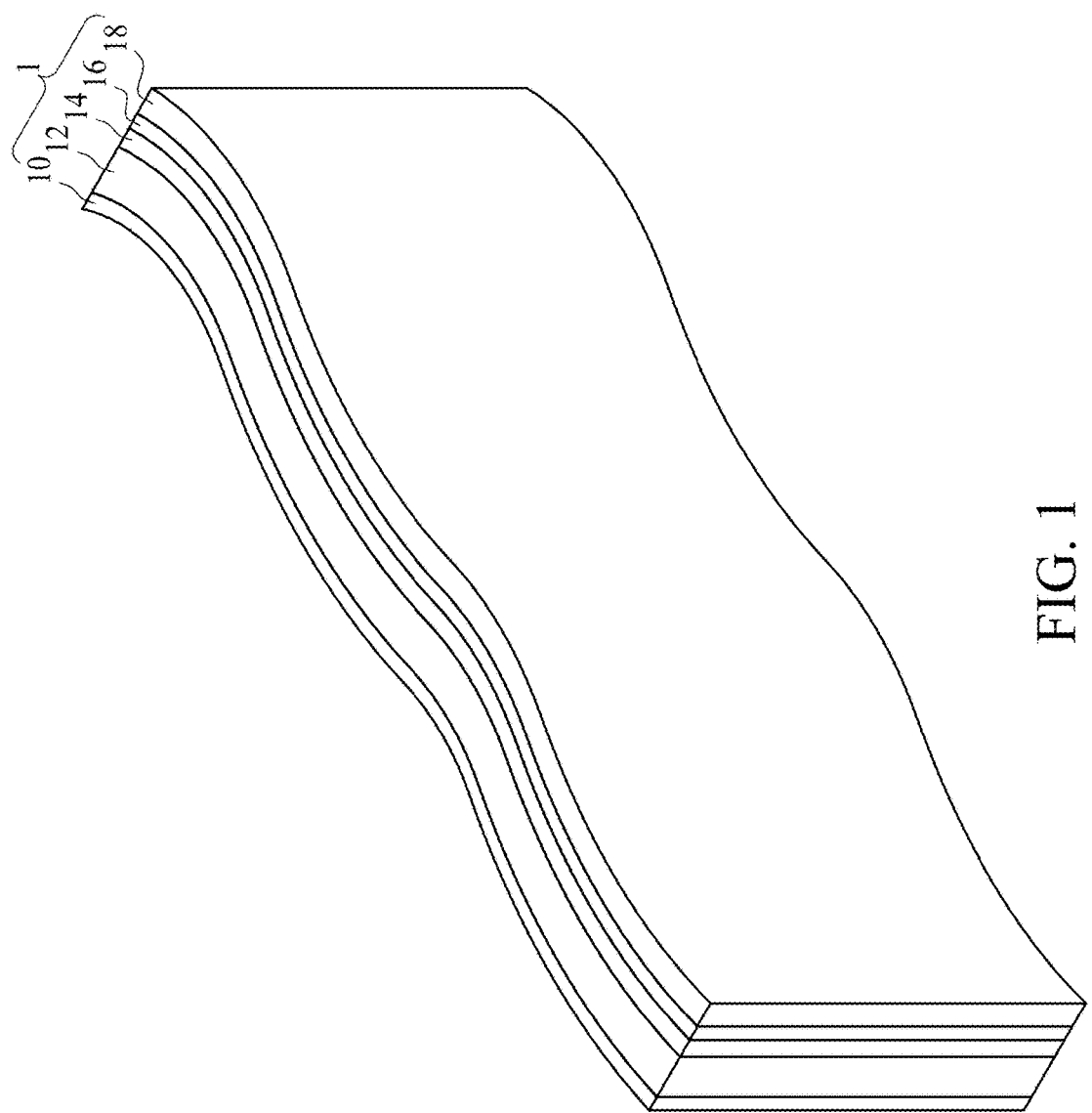
FIG. 1 is a schematic view of a conductive paper electrode in accordance with some embodiments of the present disclosure.

FIG. 1 is a schematic view of a conductive paper electrode in accordance with some embodiments of the present disclosure. Referring to FIG. 1, the conductive paper electrode 1 includes a paper 10, a carbon powder layer 12, a graphite layer 14 and a nanostructural layer 16. In some embodiments, the paper 10 can be a cellulose paper or a paper in any suitable form. The paper 10 is a non-conductive material. The carbon powder layer 12 is positioned over the paper 10. In some embodiments, the carbon powder layer 12 includes a photo-printed carbon powder layer. As an example, the carbon powder layer 12 can be formed over the surface of the paper 10 by a photocopy machine or a printer machine. The graphite layer 14 is positioned over the carbon powder layer 12. In some embodiments, the graphite layer 14 includes a textured surface, which has a greater surface area compared to a smooth surface. The materials of the graphite layer 14 and the carbon powder layer 12 mainly include carbon, and the graphite layer 14 is configured to increase reactivity for the carbon powder layer 12. The nanostructural layer 16 is positioned over the graphite layer 14. In some embodiments, the nanostructural layer 16 includes a plurality of conductive nanotubes. The nanostructural layer 16 is conductive. In some embodiments, the nanostructural layer 16 includes a metal layer such as a nickel layer.

In some embodiments, the conductive paper electrode 1 further includes an energy storage layer 18 over the nanostructural layer 16. The energy storage layer 18 is conductive. The energy storage layer 18 includes a metal oxide or a conductive polymer. As an example, the metal oxide may include manganese oxide, cobalt oxide, nickel oxide, vanadium oxide, or a combination thereof. Also for example, the conductive polymer includes, but is not limited to, Polypyrrole (PPy), Poly(3,4-ethylenedioxythiophene) (PEDOT), Polyaniline (PANI), or a combination thereof. In an exemplary embodiment, the conductive paper electrode 1 includes a stacked structure of Mn oxide nanofiber/Ni-nanotube/graphite(carbon)/paper (MNNGP) electrode.

The conductive paper electrode 1 is flexible, i.e., the conductive paper electrode 1 can be folded, twisted or bent, and retains its conductivity when it is folded, twisted or bent at various angles.

In some embodiments, the carbon powder layer 12, the graphite layer 14, the nanostructural layer 16 and the energy storage layer 18 are stacked on one of the surfaces of the paper 10. In some alternative embodiments, both of the surfaces of the paper 10 may be covered with a combination of the carbon powder layer 12, the graphite layer 14, the nanostructural layer 16 and the energy storage layer 18.

Figure 2:
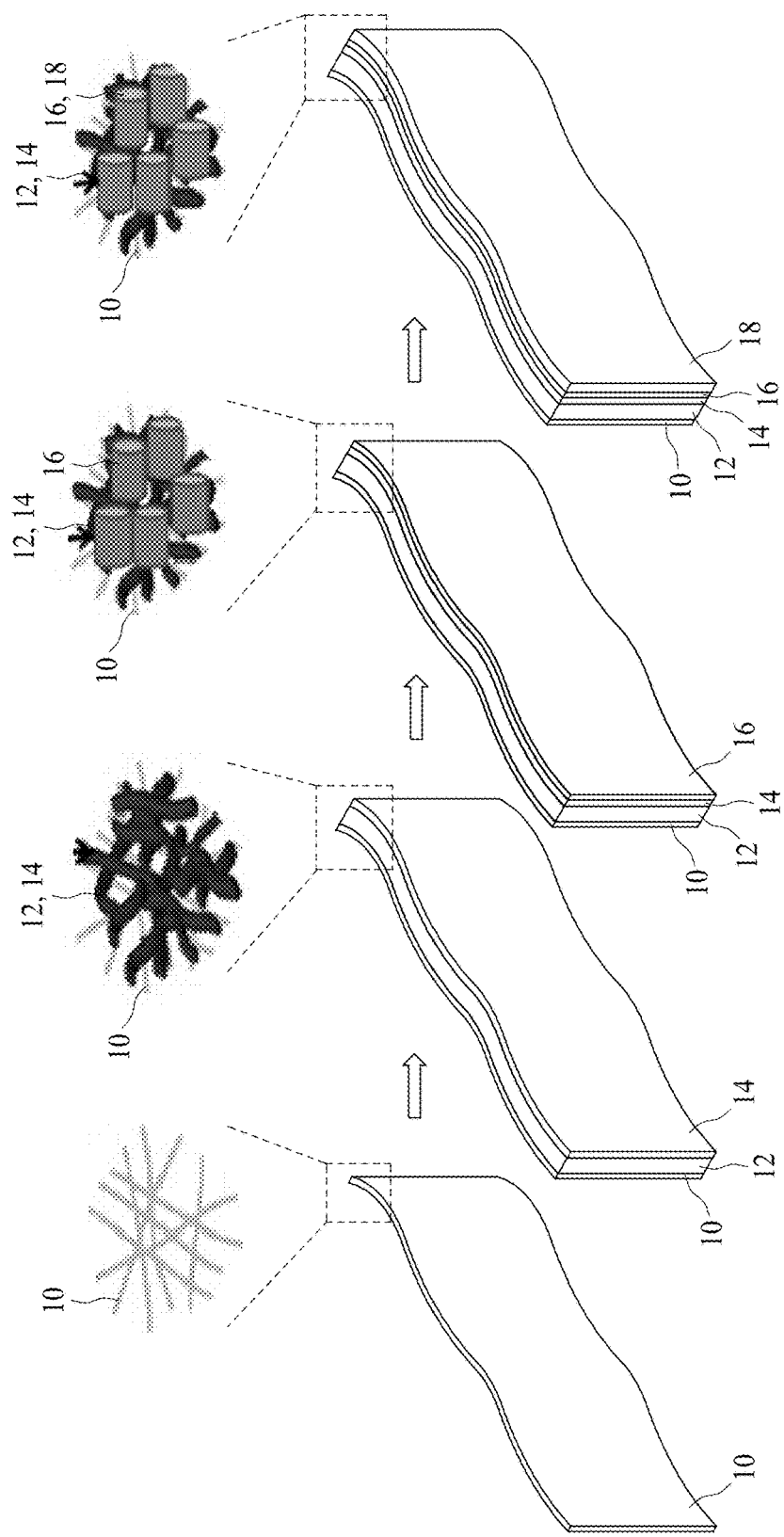
FIG. 2 is a schematic view illustrating an example of a method for manufacturing a conductive paper electrode in accordance with some embodiments of the present disclosure.
Figure 3A:
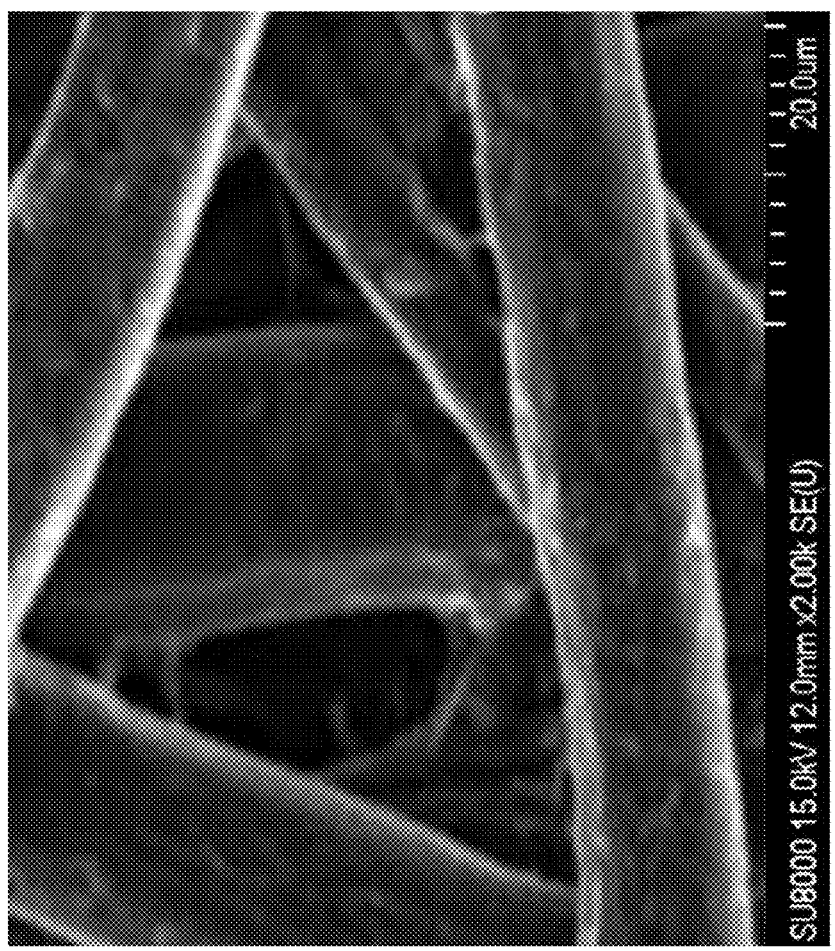
FIG. 3A shows a scanning electron microscopy (SEM) image of surface morphology of a paper.

FIG. 2 is a schematic view illustrating an example of a method for manufacturing a conductive paper electrode 1 in accordance with some embodiments of the present disclosure. First, the paper 10 is provided. In some embodiments, the paper 10 is obtained from an A4 size print paper and may be cut to a proper size. For example, the paper 10 has an area of about 10 cm$^2$. The scanning electron microscopy (SEM) image of surface morphology of the paper 10 is shown in FIG. 3A. As shown in FIG. 3A, the diameter of the cellulose fiber of the paper 10 is between about 10 μm and about 20 μm. In some embodiments, the resistance of the paper 10 is greater than about 20 M Ω.

Figure 3B:
FIG. 3B shows an SEM image of surface morphology of a carbon powder layer.

Next, the carbon powder layer 12 is formed over the paper 10. In some embodiments, the carbon powder layer 12 is photo-printed over the paper 10 by, for example, a photocopy machine or a printer machine. The SEM image of surface morphology of the carbon powder layer 12 is shown in FIG. 3B.

Figure 3C:
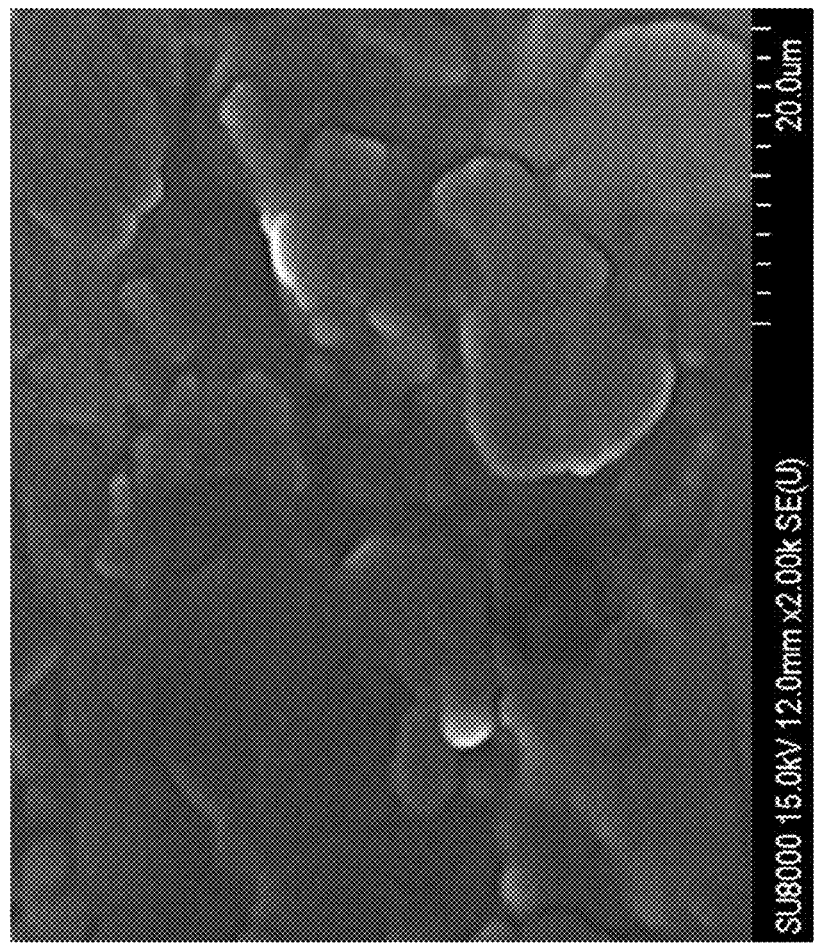
FIG. 3C shows an SEM image of surface morphology of a graphite layer.

Subsequently, the graphite layer 14 is formed over the carbon powder layer 12. In some embodiments, the graphite layer 14 is drawn or sketched on a surface of the carbon powder layer 12 with a graphite-containing tool such as a graphite pencil core, for example a 6B graphite pencil core or the like. In some embodiments, the graphite layer 14 is drawn on the surface of the carbon powder layer 12 unidirectionally to increase uniformity and to enhance adhesion for successive layers. In some embodiments, the graphite layer 14 can be drawn on the carbon powder layer 12 once, twice or more times to improve uniformity of the graphite. In some embodiments, the paper 10 can be cleaned after the graphite layer 14 is drawn. For example, the paper 10 can be dipped in deionized (D.I.) water for about 2 minutes, dipped in ethanol for about 1 minute and dipped in HCl solution having a concentration of about 0.3 M for about 10 minutes. After dipping, the paper 10 can be cleaned by D.I. water for about 2 minutes. The SEM image of surface morphology of the graphite layer 14 is shown in FIG. 3C. The carbon powder layer 12 and the graphite layer 14 increase the conductivity of the paper 10. In some embodiments, the resistance of the paper 10 with the carbon powder layer 12 and the graphite layer 14 formed thereon is less than approximately 2000Ω.

Figure 3D:
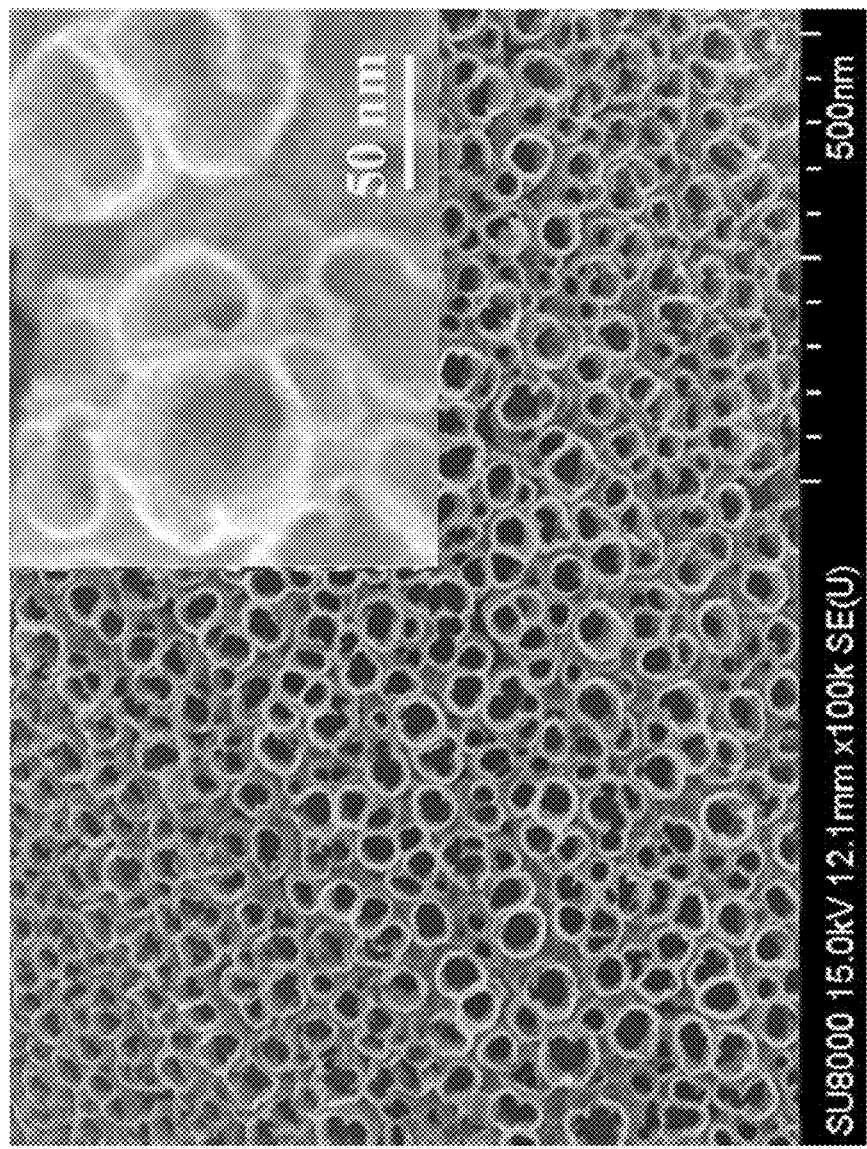
FIG. 3D shows an SEM image of surface morphology of the Ni nanotubes.

Next, the nanostructural layer 16 is formed over the graphite layer 14. In some embodiments, the nanostructural layer 16 includes conductive nanotubes, which are configured to increase surface area and adhesion for successive layers. In some embodiments, the nanostructural layer 16 is coated on the graphite layer 14 by plating such as electrodeposition at 27° C. in a three-electrode-system with a saturated-calomel reference electrode (SCE) and a Pt counter electrode. A copper-nickel (Cu—Ni) layer is first coated on the graphite layer at about 0.85V from a solution containing NiCl$_2$ (~0.5 M), NiSO$_4$ (~0.5 M), CuSO$_4$ (~0.01 M) and H$_3$BO$_3$ (~1 M, pH~3.9). The total deposited charge is about 4 C/cm2 (or 40 Coulomb). Next, Cu is electrochemically etched off from the Cu—Ni layer on changing the potential to +0.55V until a current density 20 μA/cm$^2$ to develop a Ni-nanotube layer configured as the nanostructural layer 16. The pore size has a range from about 50 nm to about 90 nm. The volume of the Ni-nanotube layer (excluding graphite or paper) is on average 0.5 mg/cm$^2$ or 5 mg for a 10 cm$^2$ area (XP105DR Mettler Toledo). In some embodiments, the residual Cu, examined with XPS, is less than 5 wt %. The SEM image of surface morphology of the Ni nanotubes is shown in FIG. 3D. In some embodiments, the resistance of the paper 10 with the carbon powder layer 12, the graphite layer 14 and the nanostructural layer 16 formed thereon is approximately less than about 1Ω.

Figure 3E:
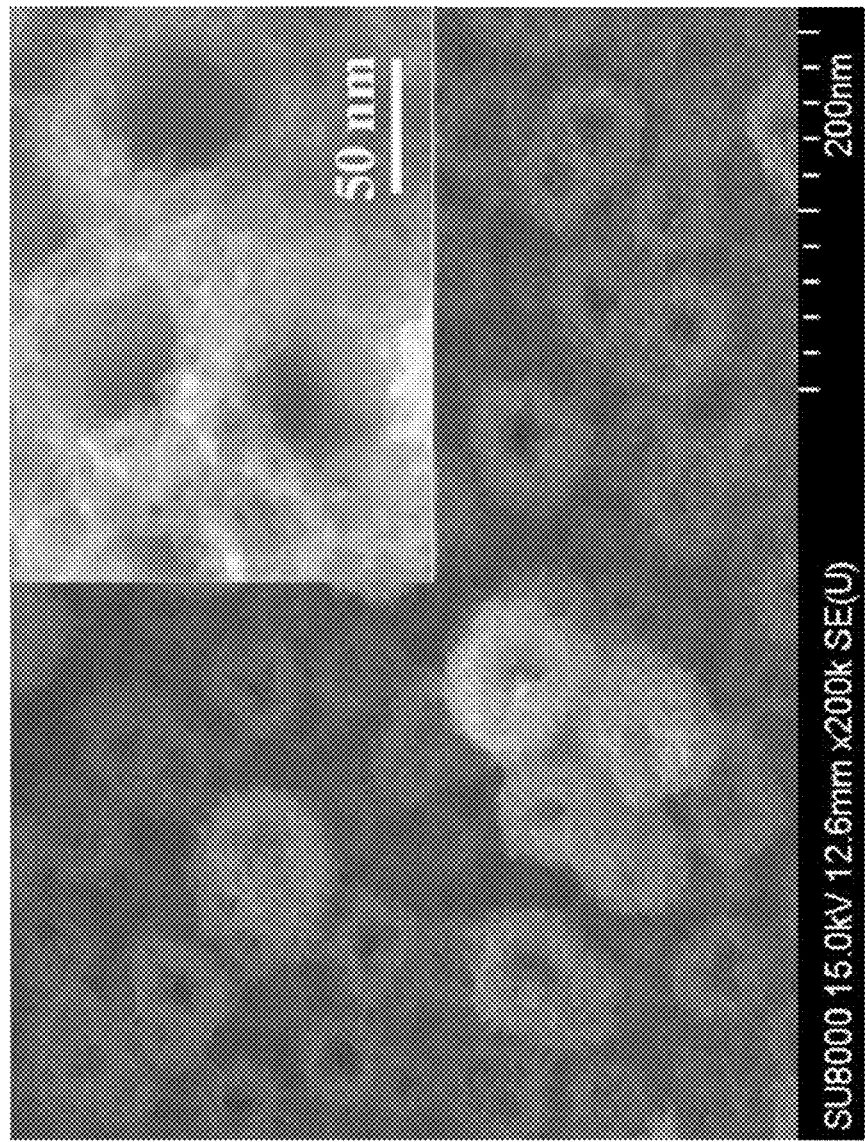
FIG. 3E shows an SEM image of surface morphology of the manganese oxide nanofibers.
Figure 3F:
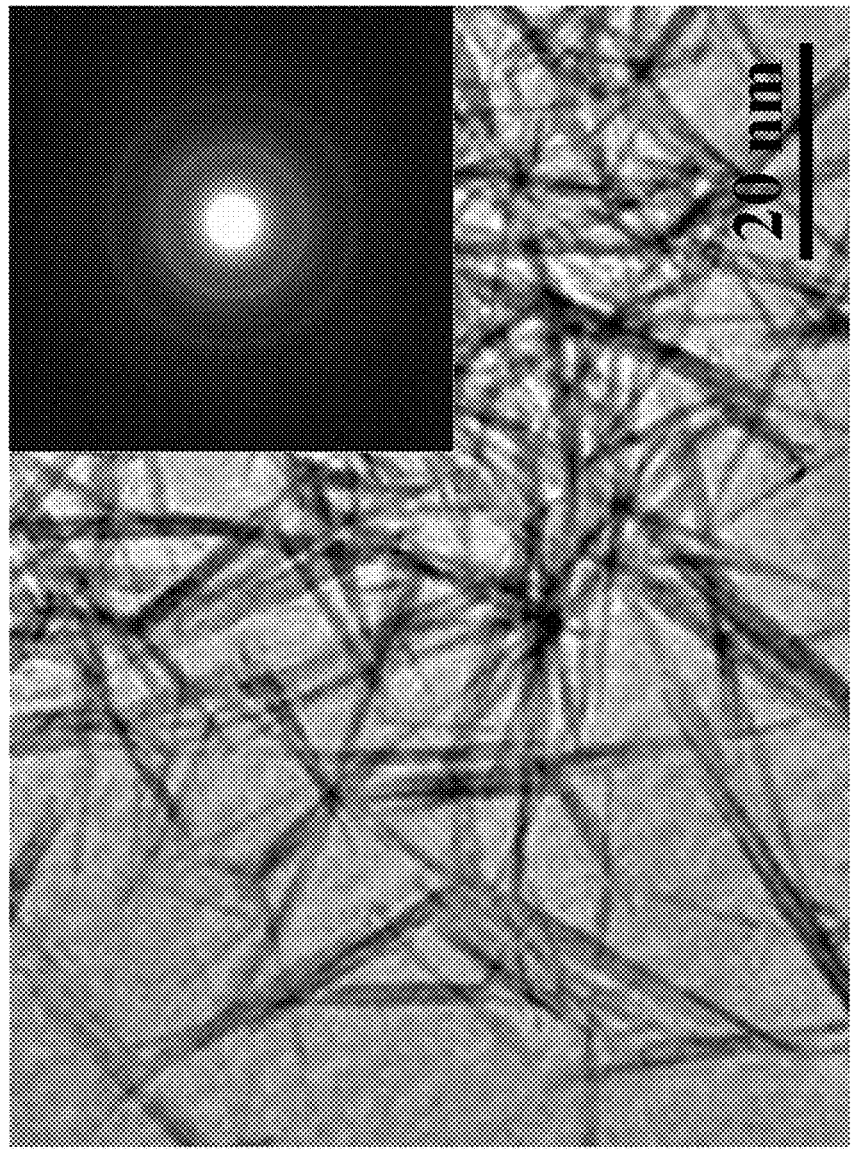
FIG. 3F shows a transmission electron microscopy (TEM) image of the manganese oxide nanofibers.

In some embodiments, the conductive paper electrode 1 is configured as an electrode of an electrochemical capacitor such as a flexible symmetrical supercapacitor (FSSC), and an energy storage layer 18 can be formed over the nanostructural layer 16. In some embodiments, the energy storage layer 18 is a metal oxide layer or a conductive polymer layer, and formed by, for example, plating. In some embodiments, the energy storage layer 18 includes nanostructures such as nanofibers due to the existing nanotubes of the underlying nanostructural layer 16. In some embodiments, the energy storage layer 18 is formed by the following process: A Mn oxide layer is electrodeposited in MnAc2 (0.25 M)+NH4Ac (0.01 M) solution at 27° C., while a constant potential of about 0.45V is applied. The mass of Mn oxide is approximately 1 mg/cm$^2$ or 10 mg (with the microbalance accuracy 0.01 mg). The SEM image of surface morphology of the manganese oxide nanofibers is shown in FIG. 3E, and the transmission electron microscopy (TEM) image of the manganese oxide nanofibers is shown in FIG. 3F, where the inset in FIG. 3F shows the SAED pattern of manganese oxide. The Mn oxide is dispersed on the Ni nanotubes, and inside the Ni nanotubes, forming a sub-micrometer-porous structure. In some embodiments, the conductive paper electrode exhibits a BET surface area of between 150 m$^2$/g and 90 m$^2$/g. The results show that conductive paper electrode with a hierarchically nanoporous structure and great surface area was realized. The Mn oxide nanofiber is determined as nanocrystalline α-type $MnO_2$. In some embodiments, the resistance of the paper 10 with the carbon powder layer 12, the graphite layer 14, the nanostructural layer 16 and the energy storage layer 18 formed thereon is between approximately 1Ω and about 2Ω.

In the description, the structure, morphology and composition of the conductive paper electrode and the electrolyte are characterized with a scanning electron microscope (SEM, JEOL 6500F), X-ray photoemission spectroscopy (XPS, NSRRC beamline BL20A), and transmission electron microscope (TEM, JEOL 2000F). The electrolyte systems are determined on a differential scanning calorimeter model (Mettler FP85) by sealing about 8 mg in an aluminum pan. The crystal structure was characterized with X-ray diffraction (XRD) techniques at SPring-8 BL12B1 (Japan). The change of Mn oxidation state was considered at varied potentials in systems with Mn K-edge X-ray absorption near-edge spectra recorded in the fluorescence yield mode at NSRRC (National Synchrotron Radiation Research Center) beamline BL07A. All X-ray absorption energies were calibrated with a Mn K-edge absorption inflection point of Mn foil at 6539 eV, which is calibrated before each run. All electrochemical tests were measured with the AUTOLAB workstation. The specific capacitance of cycle voltammetry (CV) and charge/discharge cycle is calculated as follows:

$$Csp = Qm/\Delta V \quad (1)$$

$$Csp = I\Delta t/\Delta Vw \quad (2)$$

in which Qm is the specific voltammetric charge (based on Mn oxide mass) integrated from CV, ΔV is the scanning range (i.e., 0.8V×2), I is applied current density (2 A/g), w is Mn oxide mass, and Δt is duration of discharge cycling. With charge-discharge curves based on two electrode systems, Csp is specific capacitance of symmetric supercapacitor, and energy density (E) and power density (P) are calculated from chronopotentiometric curves according to equations (3) and (4):

$$E = 1/2 Csp \Delta V_2 \quad (3)$$

$$P = E/\Delta t \quad (4)$$

Where Δt is time to discharge, and ΔV is cell voltage (i.e., 2.0V).

Figure 4:
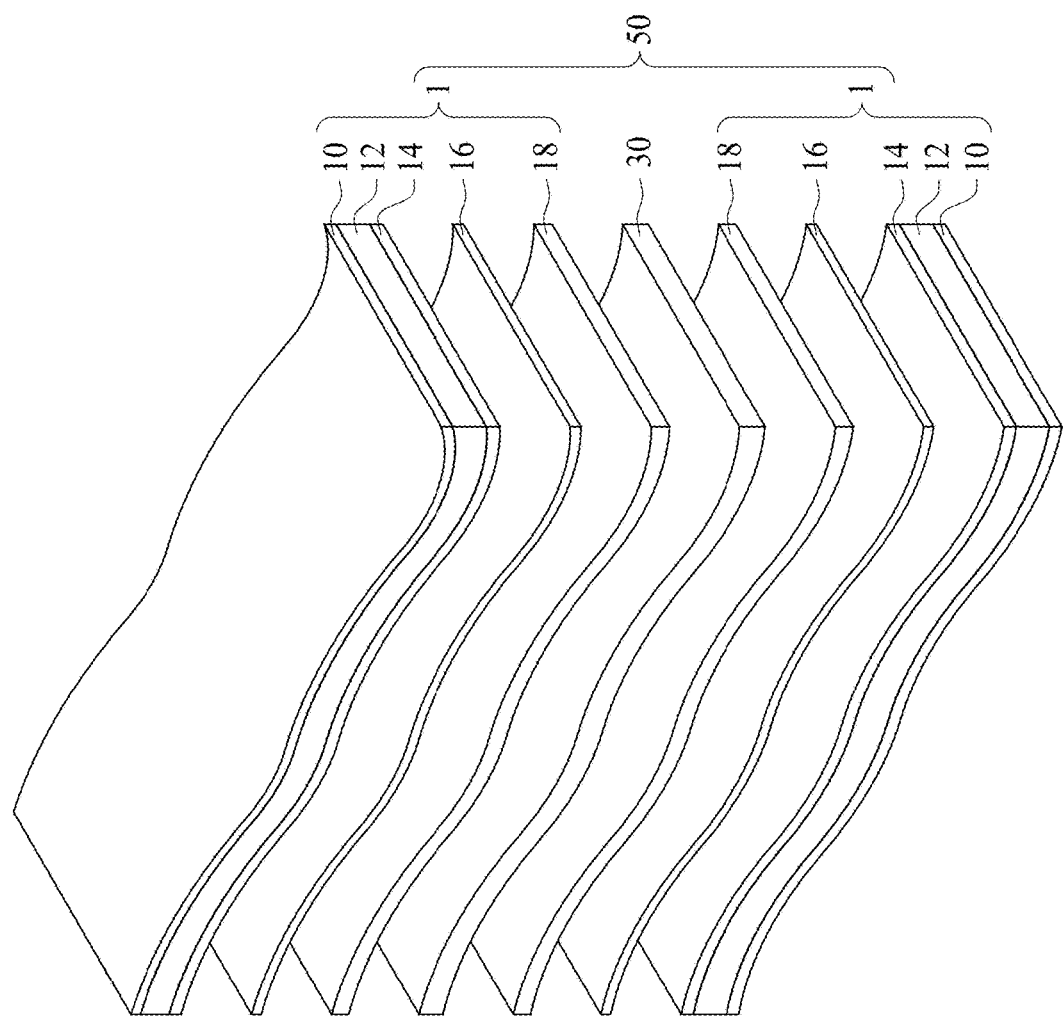
FIG. 4 is a schematic view of an electrochemical capacitor in accordance with some embodiments of the present disclosure.

FIG. 4 is a schematic view of an electrochemical capacitor in accordance with some embodiments of the present disclosure. The electrochemical capacitor 50 includes two conductive paper electrodes 1, and an electrolyte 30 interposed between the conductive paper electrodes 1. Each conductive paper electrode 1 includes the paper 10 coated with the carbon powder layer 12 and the graphite layer 14, the nanostructural layer 16 and the energy storage layer 18.

The electrolyte 30 is interposed between the energy storage layers 18 of the conductive paper electrodes 1. The electrolyte 30 is transparent. In some embodiments, the electrolyte 30 includes a lithium-containing quasi-ionic liquid and a gel, where the lithium-containing quasi-ionic liquid comprises (a) an organic compound having at least one acylamino group, and (b) a lithium salt. In some embodiments, the organic compound has at least one acylamino group, which is a functional group having a carbon atom double bonded with an oxygen atom, and single bonded with a nitrogen atom.

Figure 5:
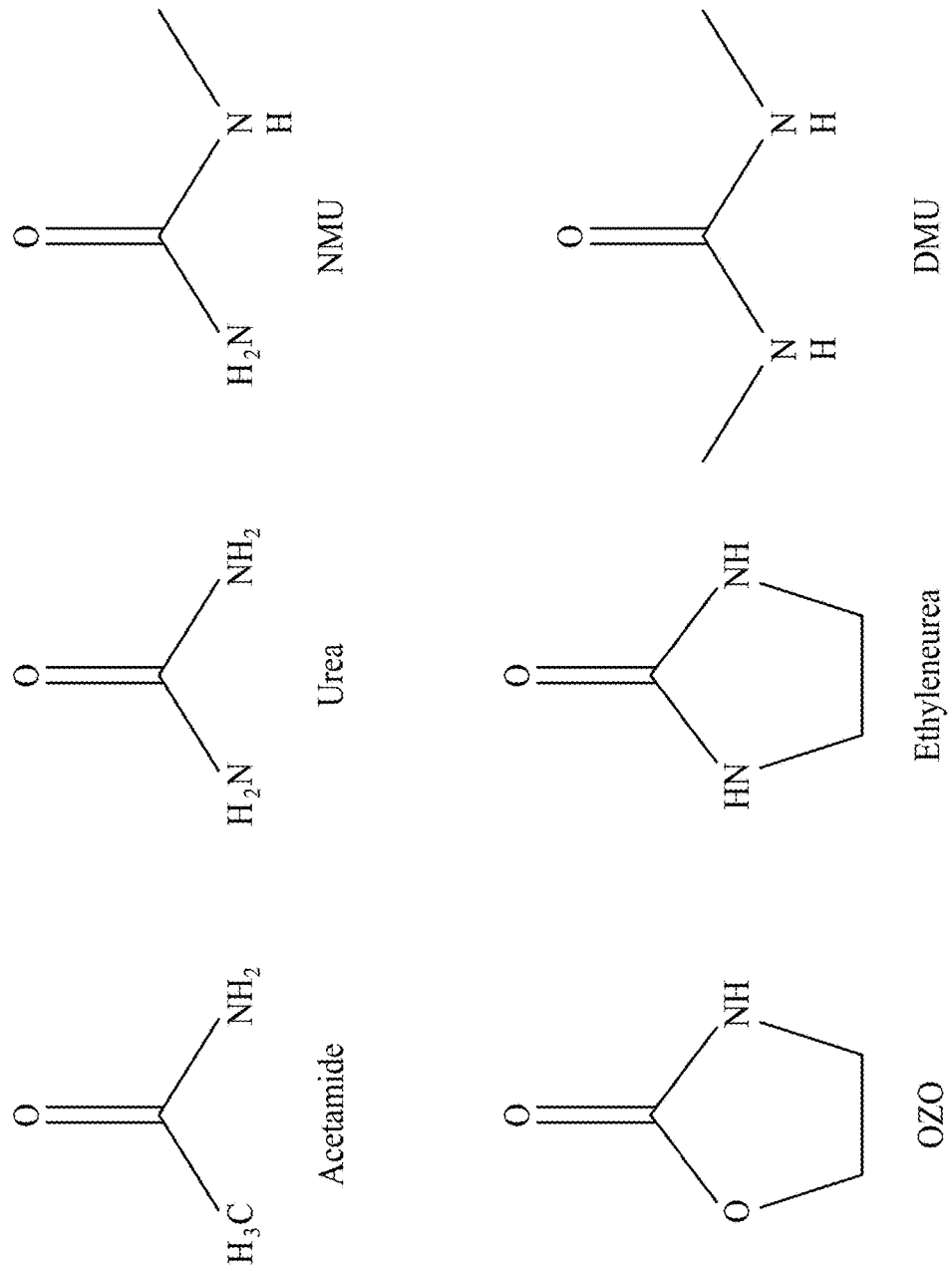
FIG. 5 lists examples of chemical formula of the organic compound constituting the electrolyte in accordance with some embodiments of the present disclosure.

As shown in FIG. 5, the selection of the organic compound includes, but is not limited to, acetamide, urea, methylurea (NMU), 2-oxazolidinone (OZO), ethyleneurea, 1,3-dimethylurea DMU, the like, or a combination thereof. The above organic compound may include cyclic compounds, such as OZO or ethyleneurea, or acyclic compounds, such as acetamide, urea, NMU, or DMU. The above organic compound is commercially ready, does not require any complex synthesis or purification processes, and is therefore lower in cost.

The lithium salt in some embodiments is characterized as LiX, where Li is lithium, and X includes $ClO_4^-$, $SCN^-$, $PF_6^-$, $B(C_2O_4)_2^-$, $N(SO_2CF_3)_2^-$, $CF_3SO_3^-$, the like, or a combination thereof. $LiN(SO_2CF_3)_2$ is also known as lithium bis(trifluoromethylsulfony)imide (LiTFSI). In some embodiments, examples of the ranges of molar ratios (ratio of lithium salt to the organic compound) of the lithium-containing quasi-ionic liquid are listed in Table 1.

TABLE 1

| Lithium Salt:Organic Compound | Range of Molar Ratios |
| --- | --- |
| LiClO$_4$:acetamide | 1:4.2~1:5.2 |
| LiClO$_4$:urea | 1:3.1~1:4.1 |
| LiClO$_4$:ethyleneurea | 1:4.2~1:5.2 |
| LiClO$_4$:OZO | 1:4.2~1:4.5 |
| LiClO$_4$:DMU | 1:4.2 |
| LiClO$_4$:NMU | 1:3.1~1:4.1 |
| LiSCN:OZO | 1:4.2~1:6.2 |
| LiSCN:acetamide | 1:4.2~1:6.2 |
| LiSCN:ethyleneurea | 1:4.2~1:5.2 |
| LiSCN:DMU | 1:4.2 |
| LiSCN:NMU | 1:3.2~1:4.2 |
| LiTFSI:acetamide | 1:4.2~1:6.2 |
| LiTFSI:urea | 1:3.2~1:4.2 |
| LiTFSI:OZO | 1:3.2~1:6.2 |
| LiTFSI:ethyleneurea | 1:4.2 |
| LiPF$_6$:acetamide | 1:4.2~1:6.2 |
| LiPF$_6$:urea | 1:3.2~1:4.2 |
| LiPF$_6$:OZO | 1:4.2~1:6.2 |
| LiPF$_6$:ethyleneurea | 1:4.2~1:5.2 |

In some embodiments, the gel includes a water-soluble gel such as polyvinyl alcohol (PVA) or the like.

In an exemplary embodiment, the lithium-containing quasi-ionic liquid includes urea-LiClO$_4$ ionic liquid, and the gel includes PVA. An example of the preparation of the electrolyte 30 is illustrated as follows. Urea-LiClO$_4$ ionic liquid with molar ratio 4:1 is prepared from urea (Acros Inc., 95+ %) and LiClO$_4$ (Acros Inc., AP). Then, the PVA/urea-LiClO$_4$ quasi-ionic liquid gel is prepared by mixing urea-LiClO$_4$ ionic liquid (5 g) and polyvinyl alcohol gel (PVA, 5 g) and heated at 110° C. for 1 hour under vigorous stirring until a homogeneous sticky solution is formed. The solution is cooled at room temperature, and the solution becomes a clear and transparent gel. The organic compound, the lithium salt and the gel are stable at room temperature and are not sensitive to water and light, and thus the electrolyte 30 can be prepared at room temperature and in a water-containing environment.

The lithium-containing quasi-ionic liquid including the organic compound and the lithium salt is conductive and configured as is an electrolyte. The gel such as PVA gel has a network structure, and the lithium-containing quasi-ionic liquid is sealed in the network structure, which allows the lithium-containing quasi-ionic liquid to travel in the space of the network structure and provide conductivity. The electrolyte 30 can have a range of properties, and the physical properties of the electrolyte 30 can be modified by, for example, adjusting the ratio of the gel to the lithium-containing quasi-ionic liquid. When the ratio of the gel to the lithium-containing quasi-ionic liquid is higher, the electrolyte 30 is softer and more flexible; when the ratio of the gel to the lithium-containing quasi-ionic liquid is lower, the electrolyte 30 is harder. In some embodiments, the weight ratio of the lithium-containing quasi-ionic liquid to the gel is, but not limited to, between about 1:4.5 and about 4:1.Consequently, the form of the electrolyte 30 can be modified by, for example, adjusting the ratio of the gel to the lithium-containing quasi-ionic liquid.

Figure 6A:
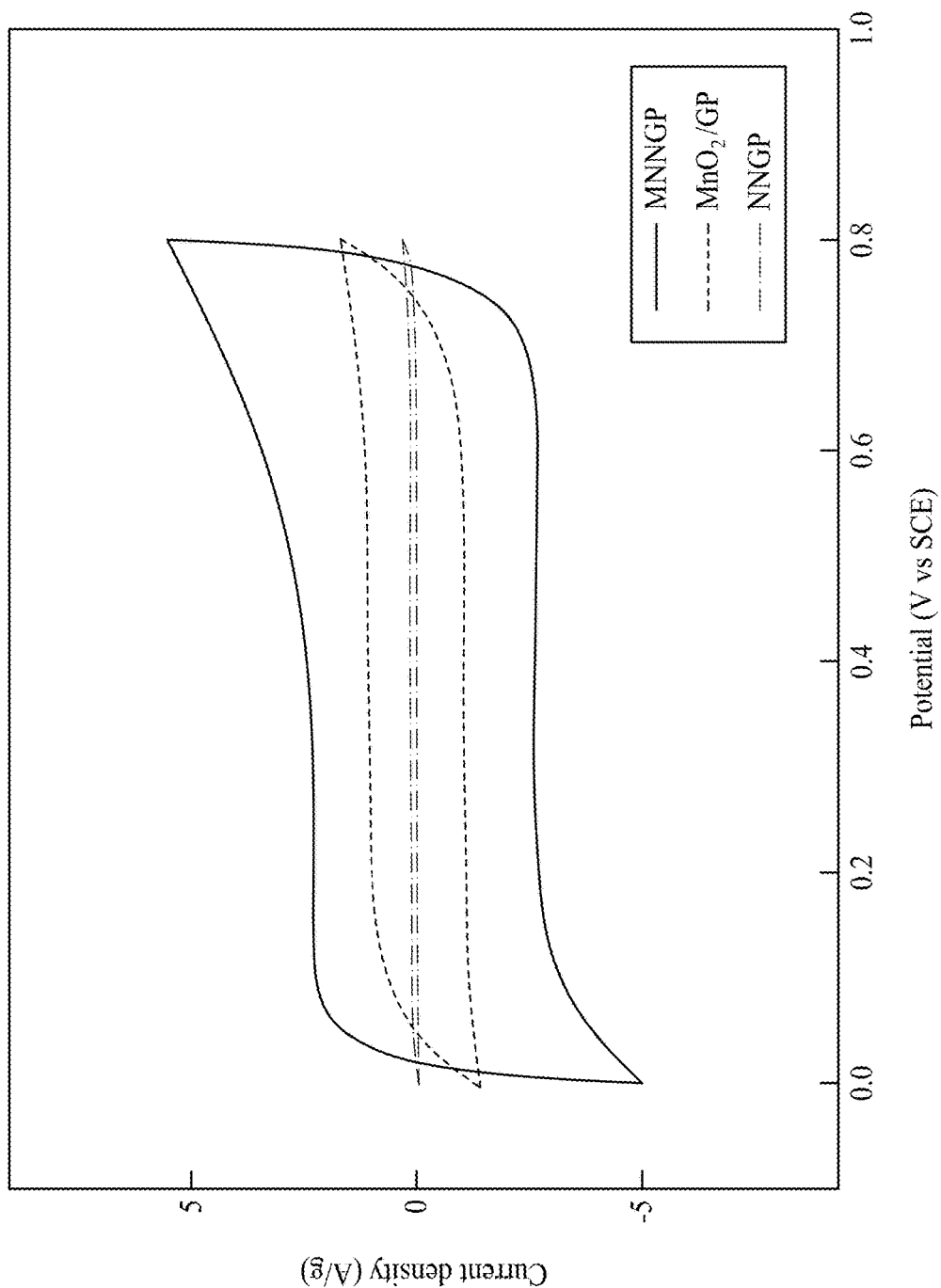
FIG. 6A shows CV curves of MNNGP, Mn oxide/GP and NNGP electrodes in $Na_2SO_4$ solution at scan rate 5 mV/s.
Figure 6B:
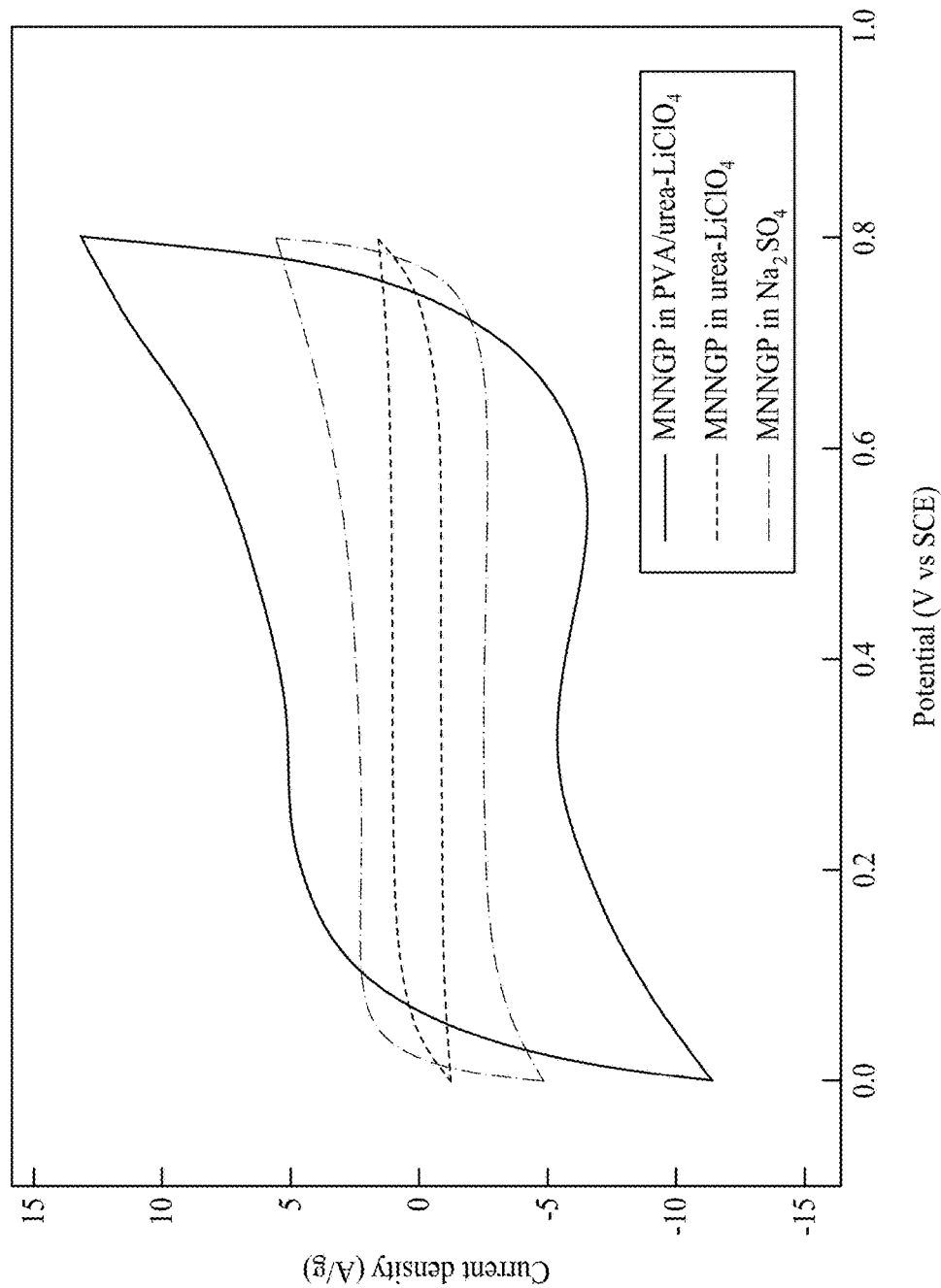
FIG. 6B shows CV curves of MNNGP electrodes in PVA/urea-$LiClO_4$, $Na_2SO_4$ and urea-$LiClO_4$ electrolytes at scan rate 5 mV/s, respectively.

The electrochemical properties of the electrochemical capacitor are studied in a three electrode cell in $Na_2SO_4$ aqueous (0.5 M), urea-$LiClO_4$ ionic liquid electrolyte and urea-$LiClO_4$/PVA quasi-ionic liquid electrolyte, respectively. The conductivity values of urea-$LiClO_4$/PVA (10 mS/cm) are greater than those of urea-$LiClO_4$/PVA (0.1 mS/cm) at 27° C. Urea-$LiClO_4$ and PVA can form a complex system. First, the CV curves of Mn oxide nanofiber/Ni-nanotube/graphite(carbon)/paper (MNNGP) electrode, Mn oxide/graphite (carbon) electrode and bare Ni-nanotube/graphite(carbon)/paper (NNGP) electrode in $Na_2SO_4$ solution at the same scan rate (5 mV/s) are shown in FIG. 6A, which is shows that the MNNGP electrode has a supercapacitive performance much better than that of the Mn oxide/GP and bare NNGP electrodes; the capacitive contribution of bare NNGP is insignificant. The calculated capacitances of MNNGP and Mn oxide/GP electrodes (deducting the substrate capacitance) are 600 F/g and 230 F/g, respectively. Mn oxide nanotube structure improves the electroactive sites and also raises the Mn oxide utilization, which raises its performance. FIG. 6B shows the supercapacitive behavior of MNNGP electrodes in aqueous $Na_2SO_4$, urea-$LiClO_4$ ionic liquid, and urea-$LiClO_4$/PVA gel electrolyte. The enclosed area of the CV curve in urea-$LiClO_4$/PVA is larger than those of $Na_2SO_4$ and urea-$LiClO_4$, respectively, which indicates a superior capability to store charge of MNNGP in urea-$LiClO_4$/PVA.

Figure 6C:
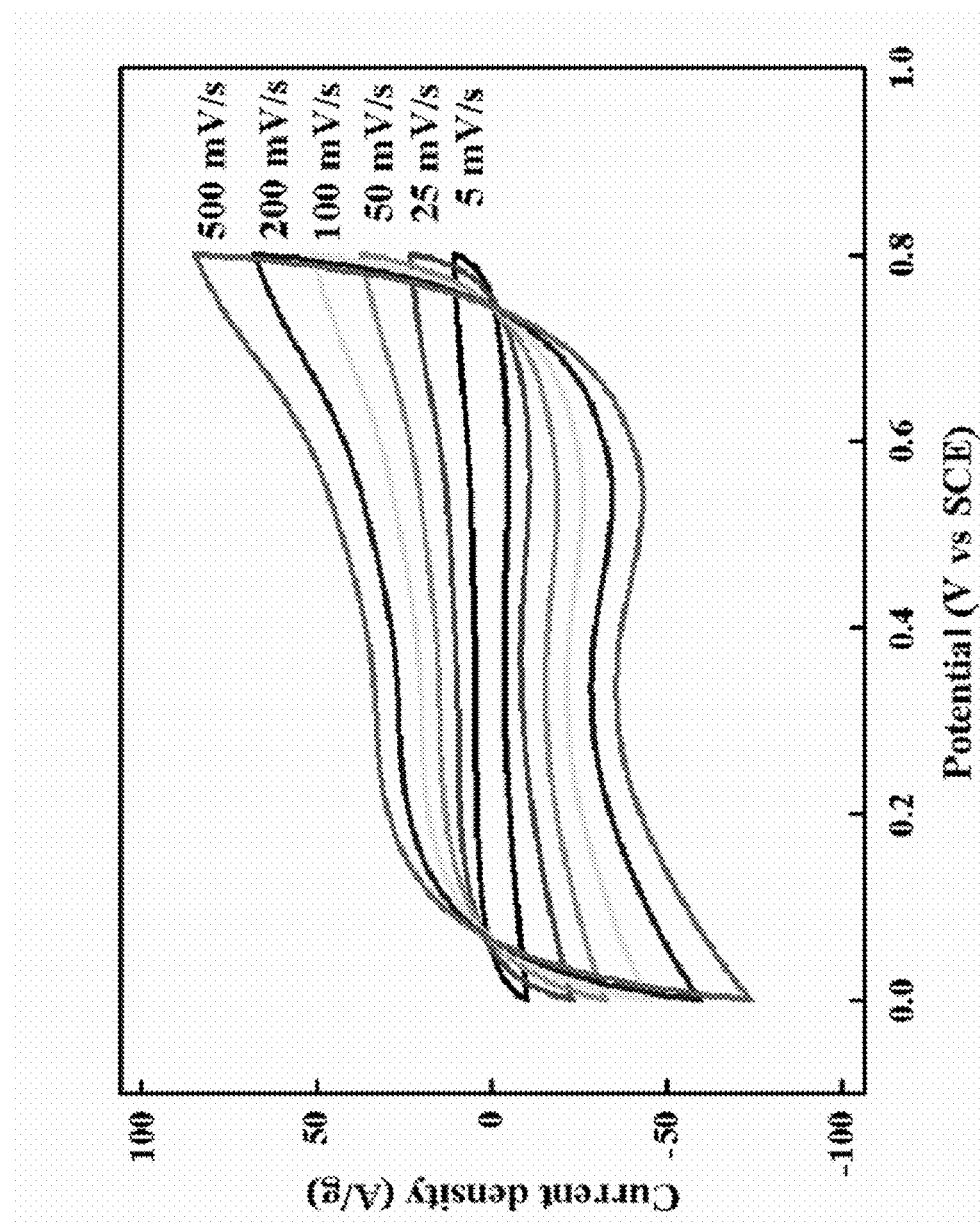
FIG. 6C shows CV curves of the MNNGP electrode measured in PVA/urea-$LiClO_4$ at varied scan rates 5 mV/s, 25 mV/s, 50 mV/s, 100 mV/s, 200 mV/s and 500 mV/s, respectively.

Electrochemical impedance spectroscopy (EIS) measurements are conducted to study the kinetics of electrochemical reaction. EIS of MNNGP and Mn oxide/GP electrodes in urea-$LiClO_4$/PVA electrolyte are measured at open circuit potential (OCP). The MNNGP electrode has lower inherent resistance (Rs) and higher electrochemical performance. In some embodiments, Rs decreases from 4.5Ω to 2.2Ω after the Ni-nanotube is fabricated on GP electrode. The result indicates that the Ni-nanotube layer decreases the internal resistance and improves the electron transportation and collection within the MNNGP electrode. The calculated capacitances of the MNNGP in urea-$LiClO_4$/PVA, $Na_2SO_4$, and urea-$LiClO_4$ are 960 F/g, 600 F/g, and 220 F/g, respectively. Csp of MNNGP electrodes in urea-$LiClO_4$/PVA is also much greater than those of $MnO2$ nanobar (625 F/g), MnO2 hierarchical tubular (315 F/g), amorphous porous $Mn_3O_4$ (432 F/g), and graphite/PEDOT/$MnO_2$ composites (264 F/g). FIG. 6C shows that response current of MNNGP electrode in urea-$LiClO_4$/PVA increases along with the scan rate. Even at 200 mV/s, the MNNGP electrodes in urea-$LiClO_4$/PVA achieve Csp as large as 700 F/g, which shows about 27% decay in Csp from about 5 mV/s to about 200 mV/s.

Figure 6D:
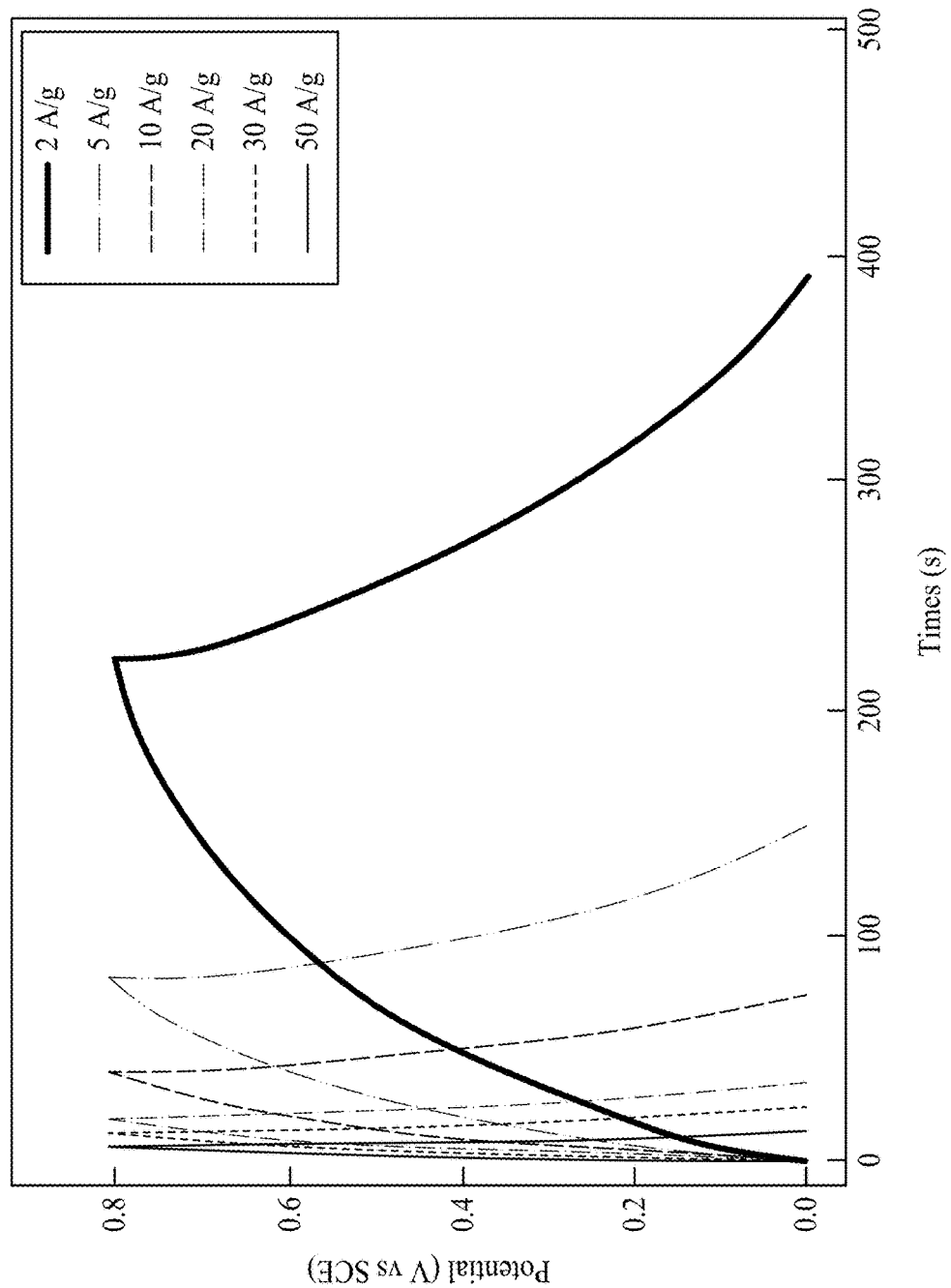
FIG. 6D shows galvanostatic charge/discharge curves of MNNGP electrode measured in PVA/urea-$LiClO_4$ at varied current densities 2 A/g, 5 A/g, 10 A/g, 20 A/g, 30 A/g and 50 A/g, respectively.
Figure 6E:
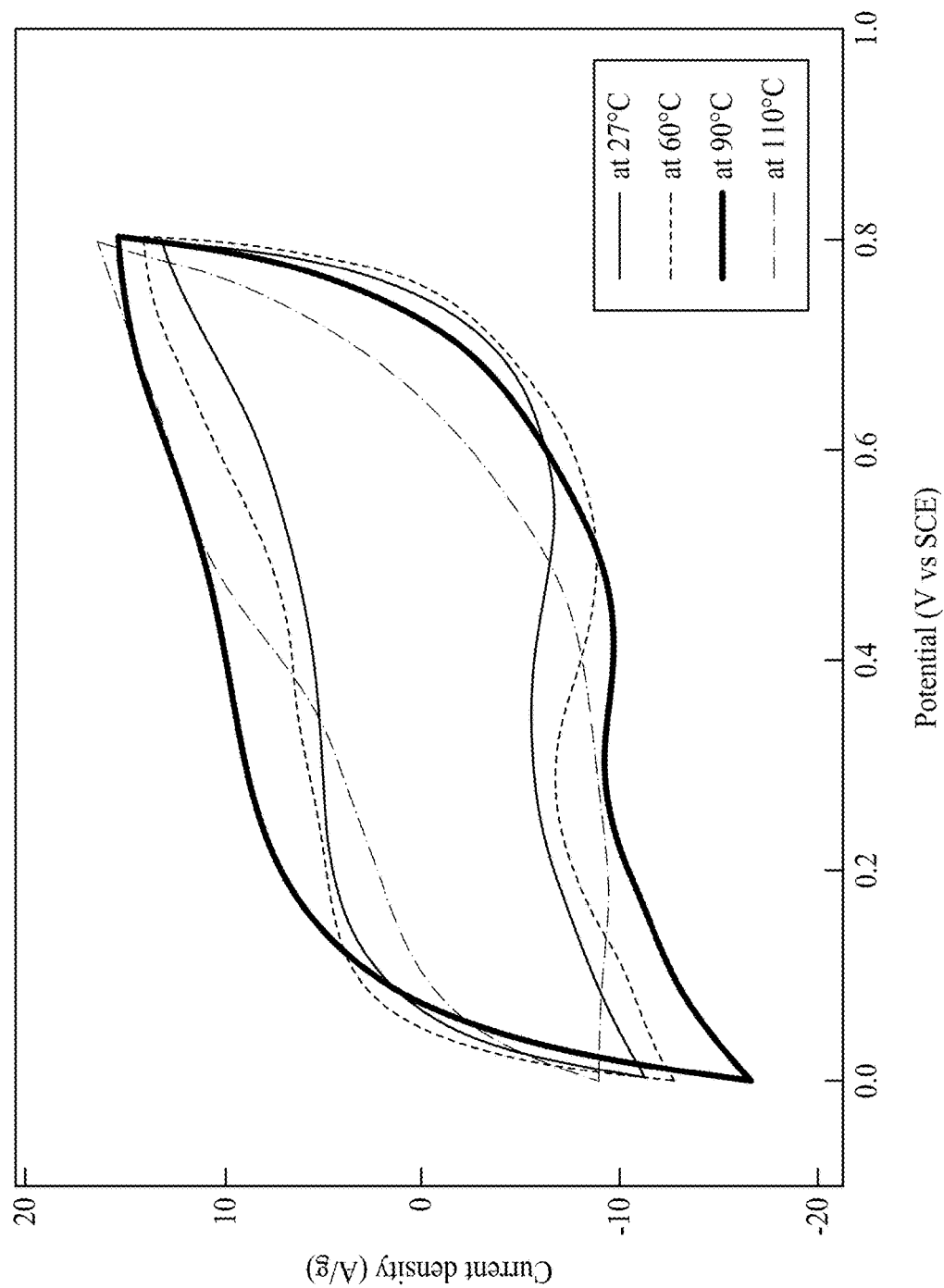
FIG. 6E shows CV curves of MNNGP electrode measured in PVA/urea-$LiClO_4$ at varied operating temperatures 27° C., 60° C., 90° C. and 110° C., respectively.
Figure 6F:
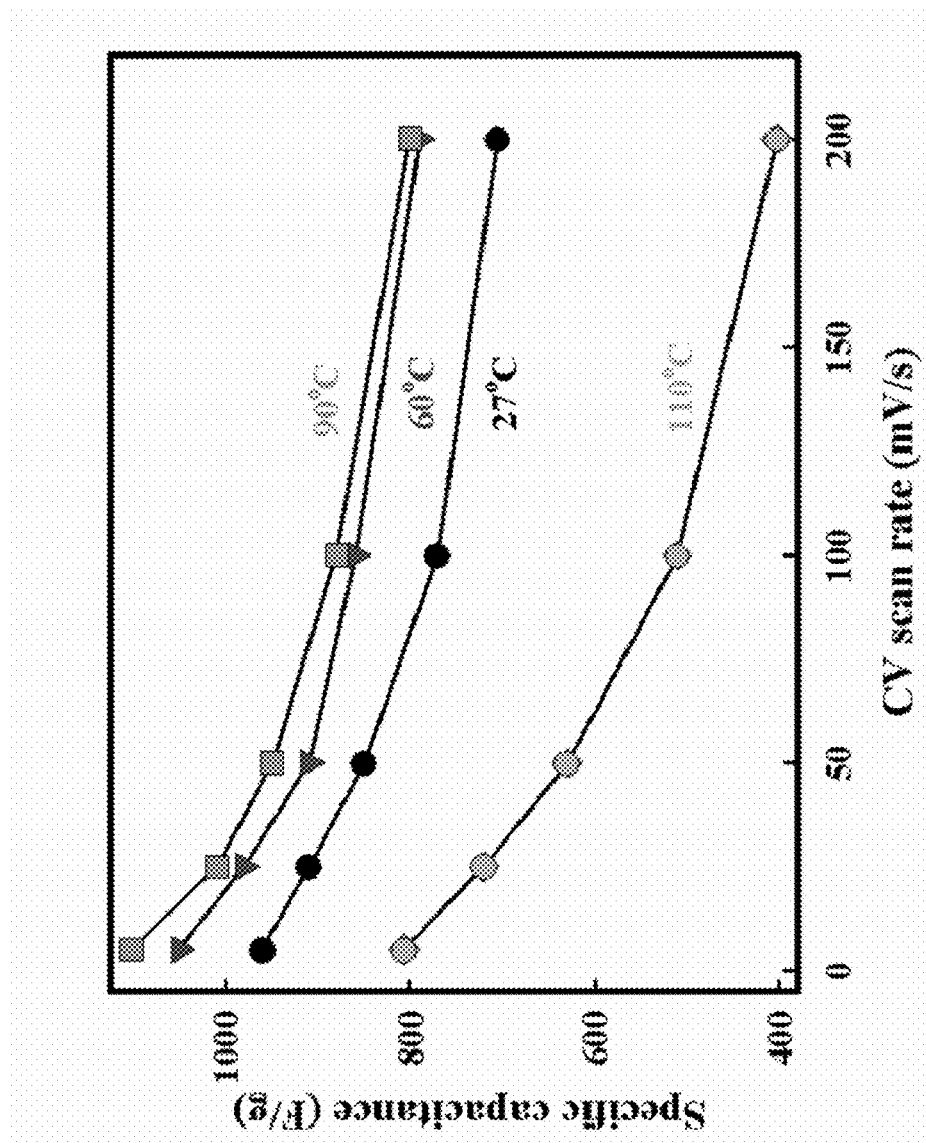
FIG. 6F shows a plot of Csp of the MNNGP electrode measured at varied temperature versus scan rate.
Figure 10:
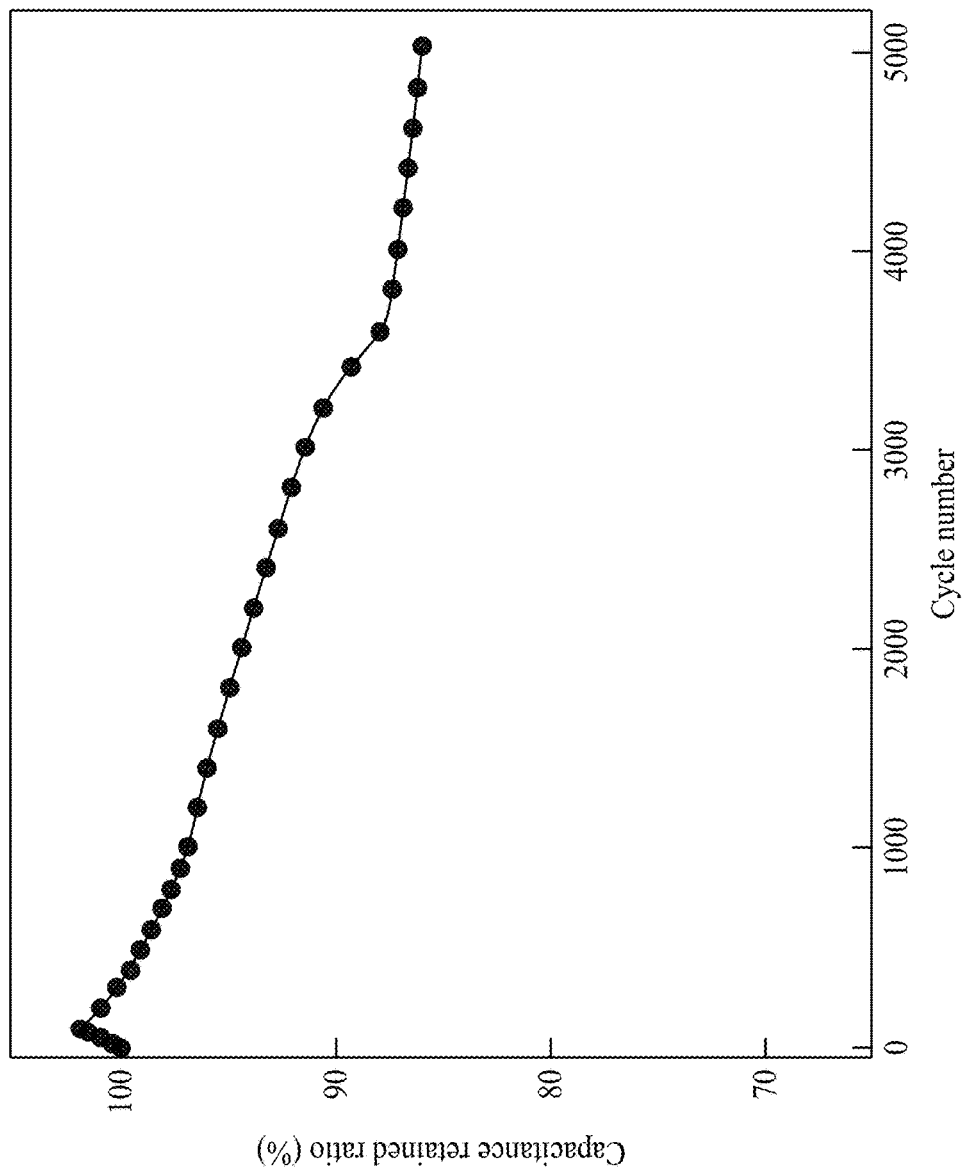
FIG. 10 shows a variation of the ratio of capacitance retained versus cycle number of MNNGP electrode in urea-$LiClO_4$/PVA.

Galvanostatic charging/discharging curves of MNNGP electrodes in urea-$LiClO_4$/PVA at varied current density are shown in FIG. 6D, and they are all symmetrical. This evidence proves the excellent reversible reactions and great pesudocapacitive properties of MNNGP electrodes in urea-$LiClO_4$/PVA. FIG. 6E compares the CV of the MNNGP electrodes in urea-$LiClO_4$/PVA at operating temperatures ranged from 27° C. to 110° C. The data shows that the CV curve area in urea-$LiClO_4$/PVA at 60° C. and 90° C. are larger than those obtained at 27° C. It is worth noting that CV curves usually have the sloping property at high temperatures that might be attributed to (i) $MnO_2$ layer passivation or (ii) pseudocapacitive dedication ($MnO_2$ layer) occurring more at high temperatures than at low temperatures. Csp measured in urea-$LiClO_4$/PVA at 27° C., 60° C., 90° C., and 110° C. are 960 F/g, 1050 F/g, 1100 F/g, and 800 F/g, respectively. Csp of the MNNGP electrode measured in urea-$LiClO_4$/PVA at varied operating temperature is plotted versus scan rate (5 mV/s-200 mV/s) in FIG. 6F. The results exhibit an excellent pseudocapacitive performance of MNNGP electrodes and urea-$LiClO_4$/PVA electrolyte system at high temperatures. It also indicates great kinetic performance and reactivity of MNNGP electrodes in urea-$LiClO_4$/PVA at temperatures up to 90° C. To further evaluate the stability of the MNNGP electrodes in urea-$LiClO_4$/PVA at various operating temperatures, the cycle life for 5000 cycles is tested at 25 mV/s. FIG. 10 shows a variation of the ratio of capacitance retained versus cycle number of MNNGP electrode in urea-$LiClO_4$/PVA. As shown in FIG. 10, only approximately 15% capacitance loss at 90° C. after 5000 cycles in urea-$LiClO_4$/PVA is observed. The gradually increasing capacitance during the first 100 cycles might be related with the electrode wetting/activation procedure in urea-$LiClO_4$/PVA. The results confirm the great cycle-life stability of the MNNGP electrode in urea-$LiClO_4$/PVA at high temperatures. The improved electrochemical performance of the MNNGP electrodes in urea-$LiClO_4$/PVA electrolyte is attributed to the sub-micrometer-porous structure of Mn oxide nanofibers and Mn oxide/Ni-nanotube/graphite structures.

The MNNGP electrodes in urea-$LiClO_4$/PVA electrolyte are advantageous for at least the following reasons. (1) The highly conductive Ni-nanotube core films would relax the ions transport because of the hollow nanostructures. The Mn oxide nanofiber film is linked closely to Ni-nanotube layers, which provides electron "expressways" for charge storage/delivery due to high electrical conductivity, which surmounts a key shortcoming of $MnO_2$ and increases the paper conductivity. (2) The Mn oxide nanofiber connected directly and greatly dispersed on the NNGP electrode not only forms the open sub-micrometer-porous structures but also creates efficient-diffusion pathways for electrolyte ions, which remarkably increase ion intercalation and utilization rate of the electrode. (3) Li(urea)$_n^+$ ions from electrolyte as the working ions insert/desert into/from the electrode and lead to great oxidation-state change.

Figure 7A:
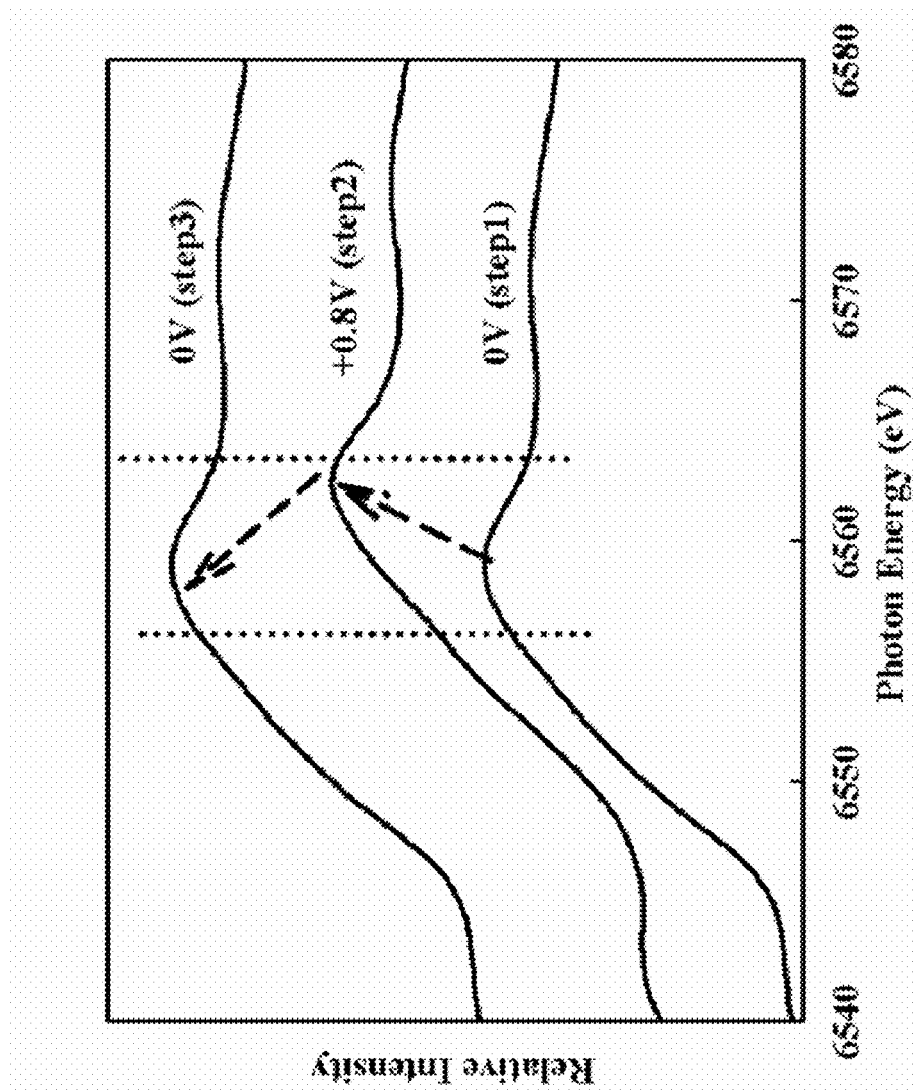
FIG. 7A shows Mn K-edge XANES spectra of MNNGP electrode recorded in urea-$LiClO_4$/PVA electrolyte at 90° C. under various applied potentials.
Figure 7B:
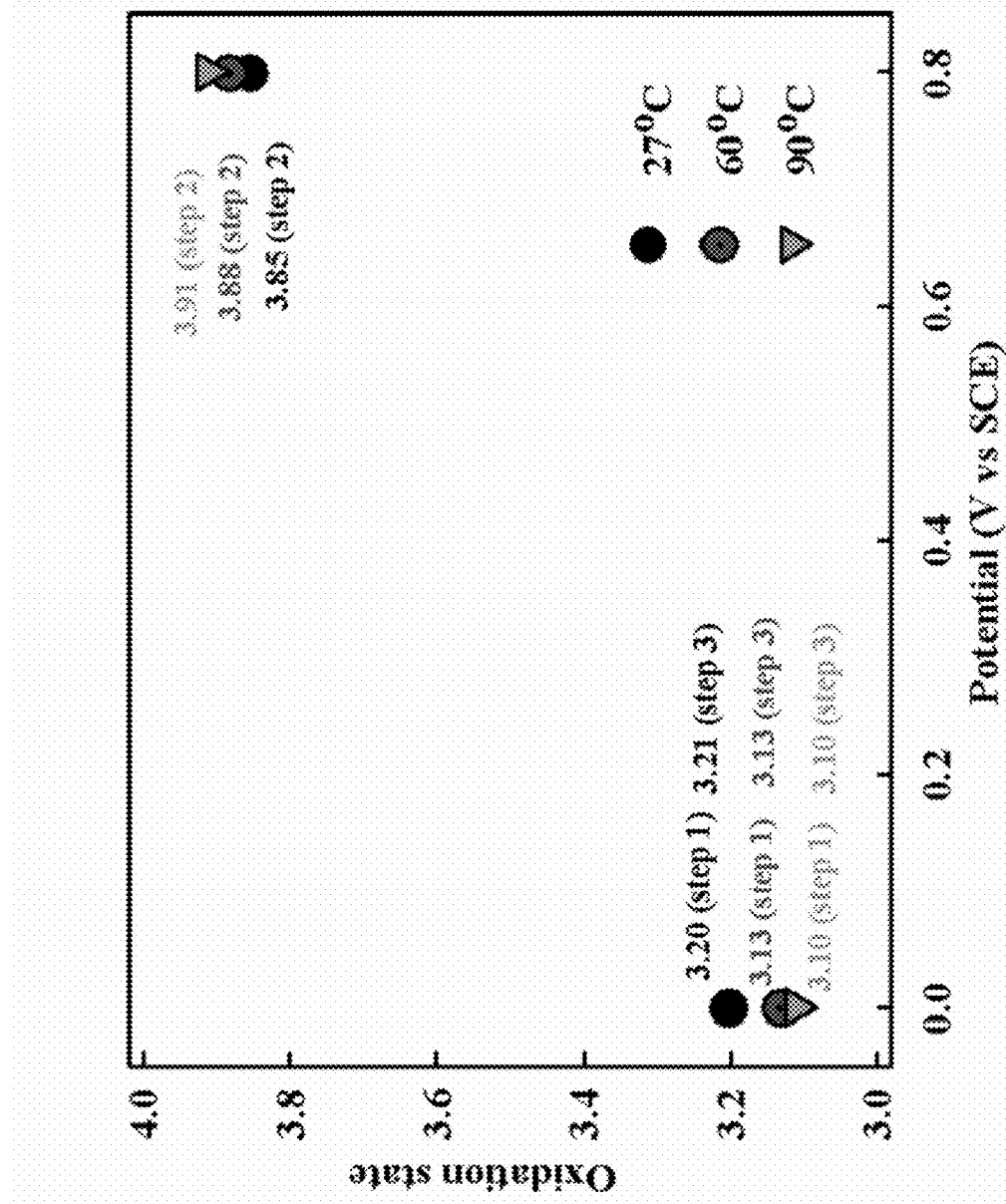
FIG. 7B shows a variation of the Mn oxidation state in urea-$LiClO_4$/PVA at 27° C., 60° C. and 90° C. with applied potential.

To illustrate the oxidation-state change of MNNGP electrode in urea-$LiClO_4$/PVA and the energy storage mechanism at varied operating temperature during charge/discharge cycles, the chemical state change with different applied potentials by in situ Mn K-edge XAS is investigated. Experimental results show XANES spectra of MNNGP electrode in urea-LiClO$_4$/PVA at 90° C. recorded at applied potentials varied in this sequence: +0V, then +0.8V, and finally returning to +0V. A rising edge of Mn K-edge spectra of MNNGP altered to increasing energy with enhanced potential, and came back almost to the original state as the potential was reversed. An absorption threshold energy (E0), which is obtained from the first inflection point of the edge, is associated with transition-metal oxidation states. On the basis of E0 derived from XANES in FIG. 7A, Mn oxidation states of MNNGP electrode in urea-LiClO$_4$/PVA at varied temperature is established and displayed in FIG. 7B. (MnO (II), Mn$_2$O$_3$ and MnO$_2$ are researched as reference samples.) The oxidation-state changes at 27° C., 60° C. and 90° C. are, very notably, approximately 0.81 for each, which is greater than that in other published findings of only around ~0.4, where an ideal value is 1. This effect implies a great ionic/electronic conductivity for MNNGP electrode in urea-LiClO$_4$/PVA electrolyte system at high temperature and a continuous and reversible Mn$^{3+}$/Mn$^{4+}$ reaction of MNNGP occurring in urea-LiClO$_4$/PVA that promotes the high performance noticed in FIGS. 5 and 6.

To achieve the application of energy storage devices, the FSSC based on two conductive paper electrodes (MNNGP electrodes) in urea-LiClO$_4$/PVA quasi-ionic liquid electrolyte is assembled as shown in FIG. 4. The assembled FSSC devices are planar, and are both thin and lightweight, with a thickness of about 1.0 mm and a weight of about 70 mg. The constructed FSSCs have outstanding flexibility, great mechanical properties, and can endure varied bending and twisting angles.

Figure 8A:
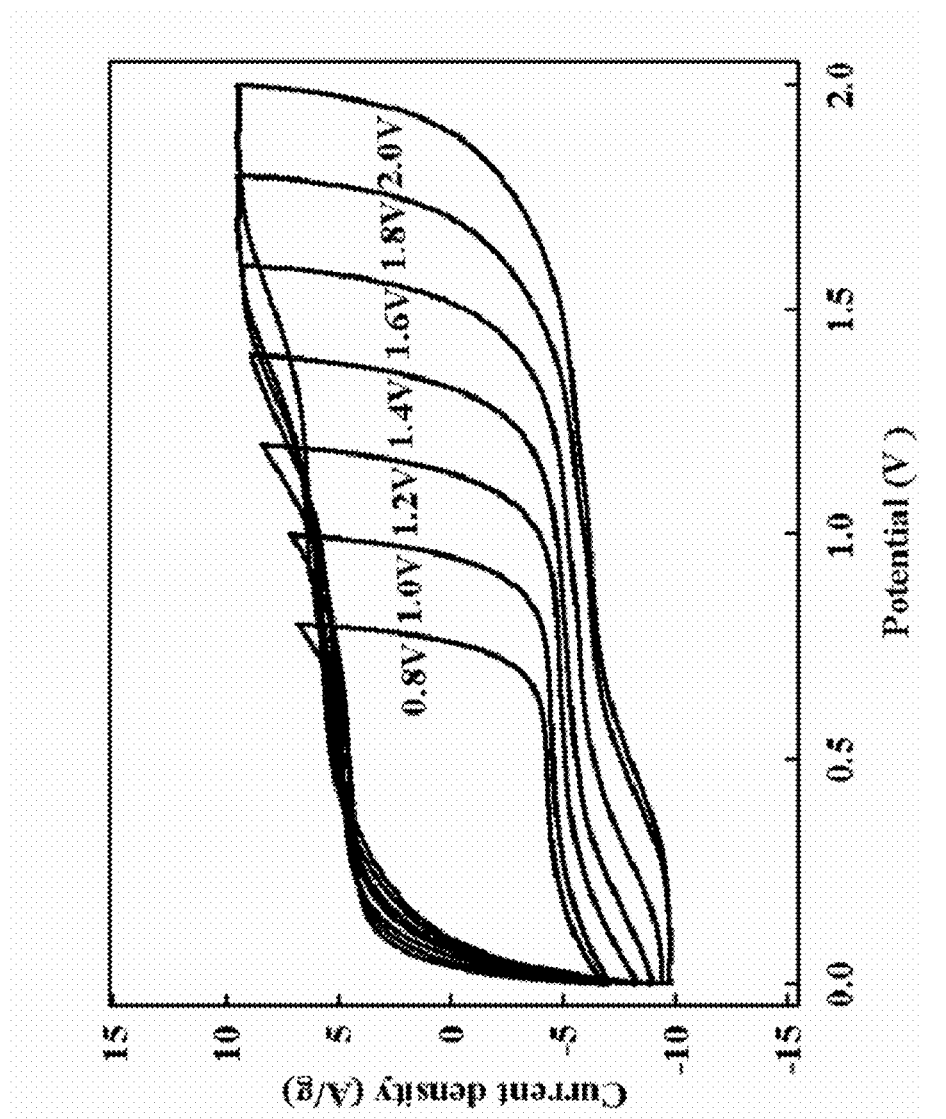
FIG. 8A shows CV curves of an FSSC device at potential from 0.8V to 2.0V.
Figure 8B:
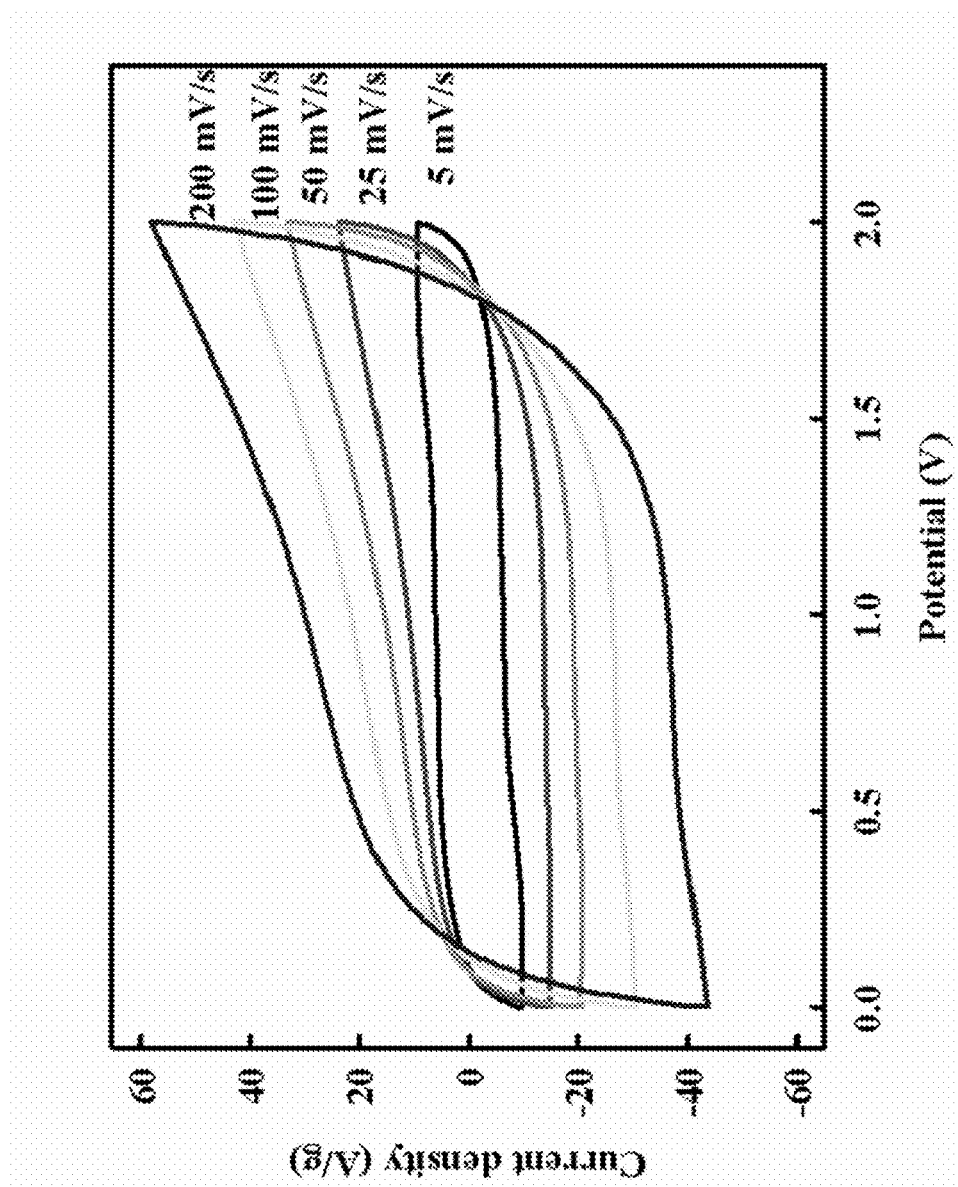
FIG. 8B shows CVs curves of the FSSC device at varied scan rates 5 mV/s, 25 mV/s, 50 mV/s, 100 mV/s and 200 mV/s, respectively.
Figure 8C:
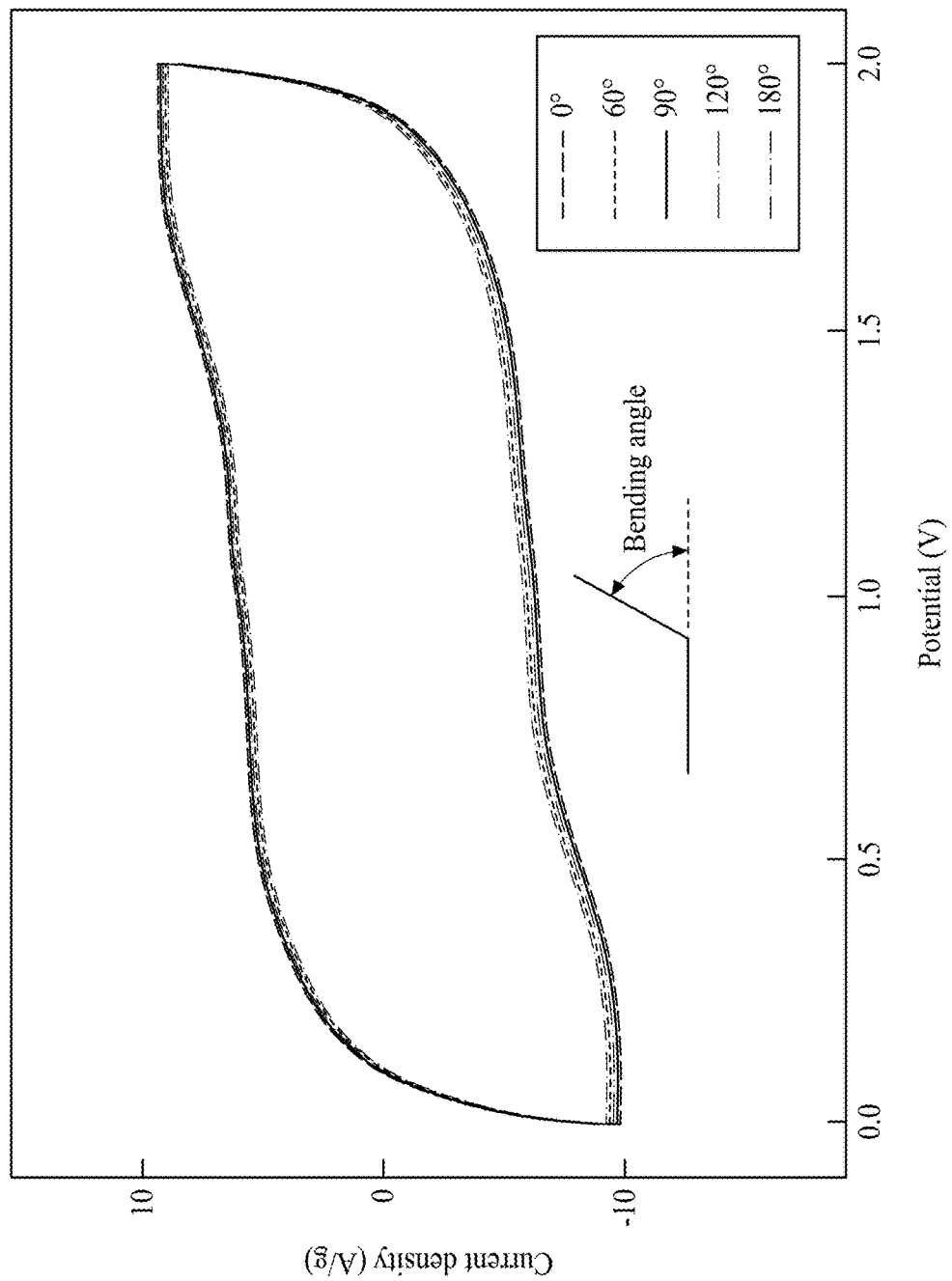
FIG. 8C shows CV curves of the FSSC device at varied bending angles.
Figure 8D:
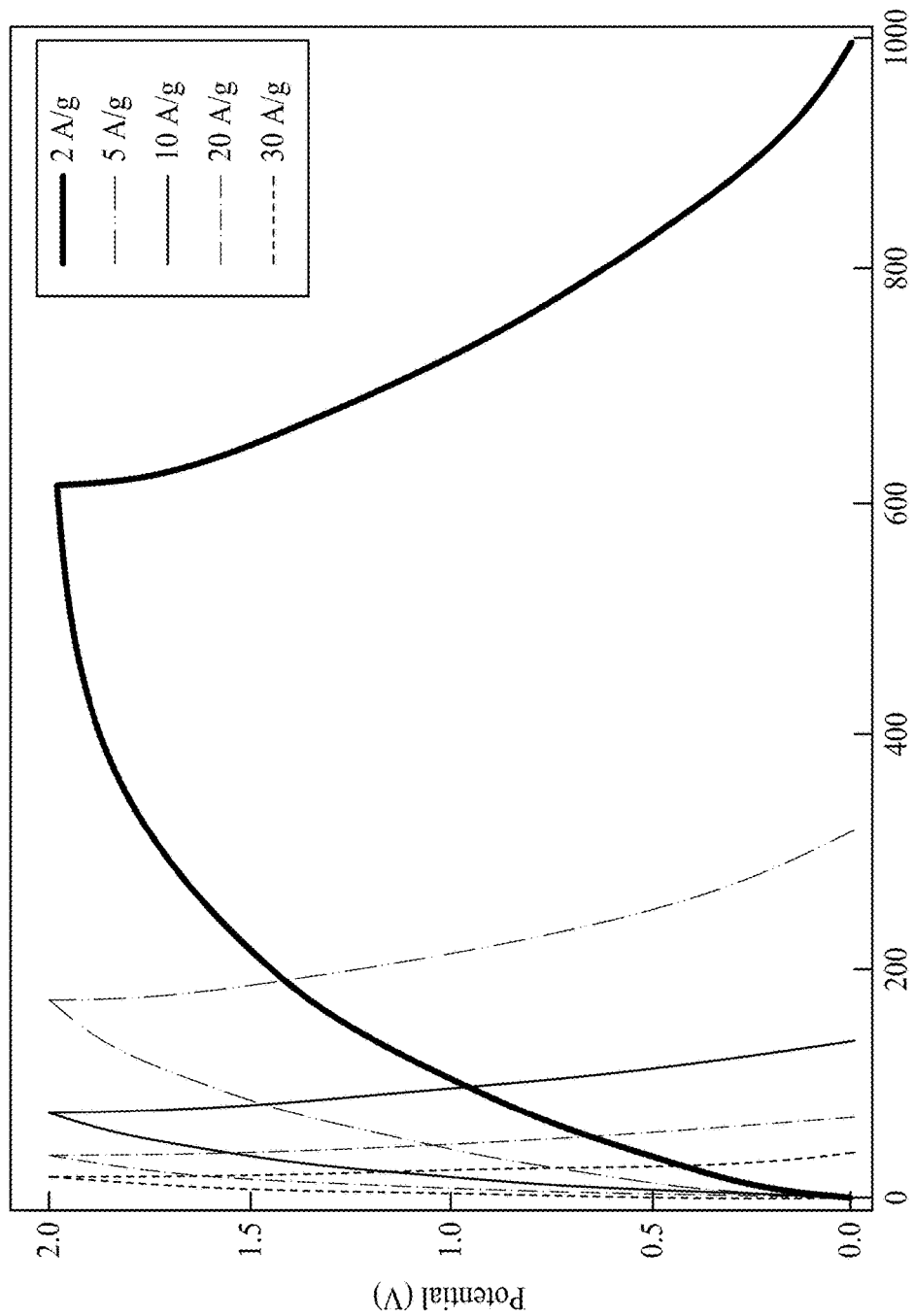
FIG. 8D shows galvanostatic charge/discharge curves of the FSSC device at varied current densities 2 A/g, 5 A/g, 10 A/g, 20 A/g and 30 A/g, respectively.
Figure 9:
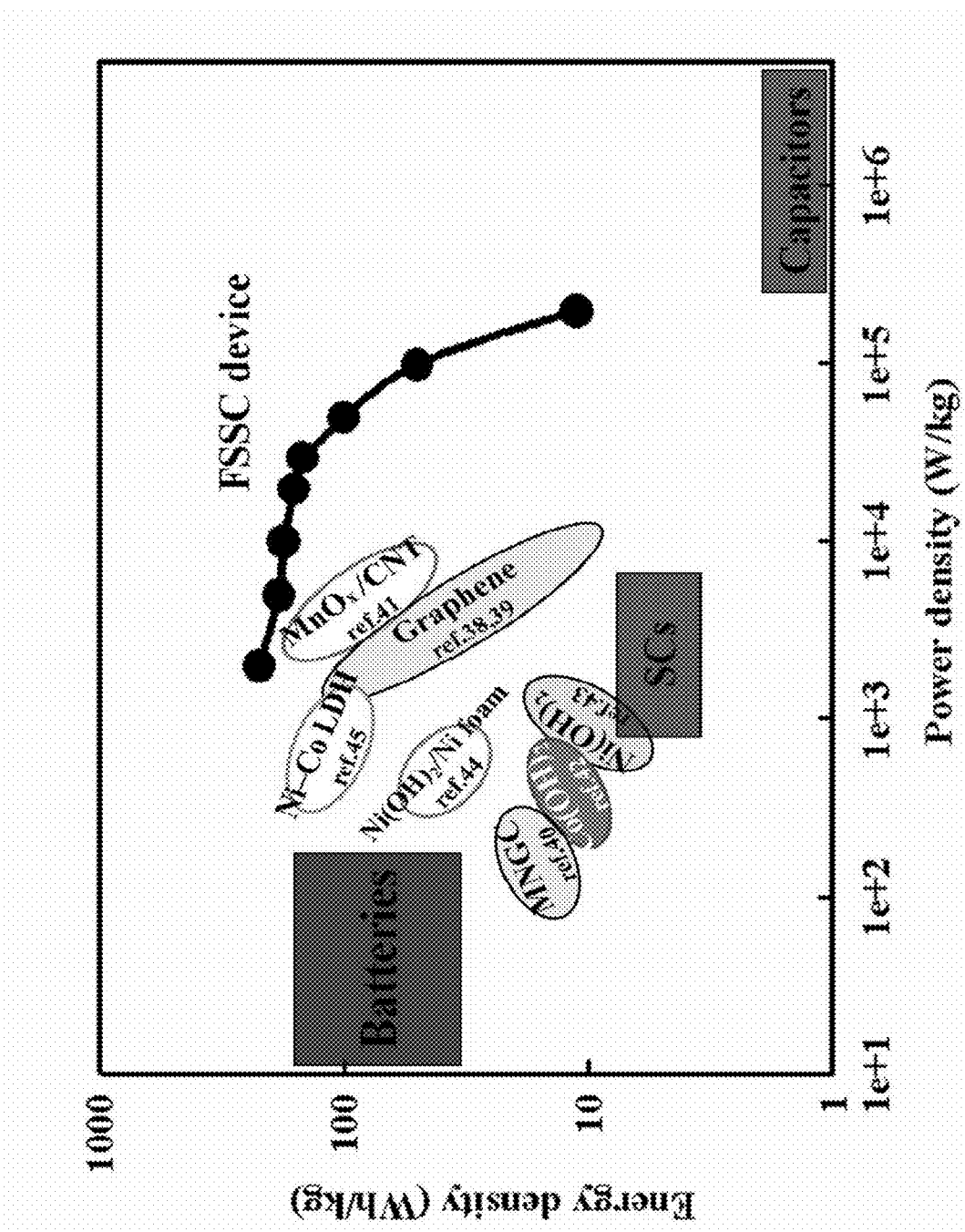
FIG. 9 shows Ragone plots of the FSSC device and other SCs reported in the literature.

A cell voltage is an important parameter in deciding the power/energy-performance of a SC. As shown in FIG. 8A, the CV curves of an FSSC device are investigated at scan rate 5 mV/s from about 0.8V to about 2.0V. The FSSC device remained stable at the operating voltage window of 0.8V-2.0V. The FSSC devices are also tested at different scan rates as shown in FIG. 8B. All CV curves show rectangular-like curves even at 200 mV/s, which also suggest the great supercapacitive performance of the FSSC device. The FSSC device shows Csp 380 F/g in voltage region 2.0V at 5 mV/s (based on Mn oxides mass) and has a great rate-capability. It is noteworthy that the supercapacitive performance of the FSSC device shows nearly no variance under numerous distortion conditions including bending a full 180° and then returning to an unbent position as presented in FIG. 8C, further proving that FSSC devices have outstanding mechanical flexibility. Galvanostatic charge/discharge curves of FSSC at different current densities are shown in FIG. 8D. The curve also keeps a satisfactory symmetry even at 30 A/g, confirming its excellent capacitive behavior and rapid charge/discharge capability of the FSSC. The calculated Csp are 380 F/g, 332 F/g, 315 F/g, 287 F/g and 265 F/g at 2 A/g, 5 A/g, 10 A/g, 20 A/g, and 30 A/g, respectively. The maximum energy density 211.1 Wh/kg, occurring at a power density of 0.2 kW/kg, and the reasonable energy densities occurring at greater power densities (for example, 50 Wh/kg at 100.0 kW/kg), are obtained from the FSSC device as shown in FIG. 9. The energy density obtained from an FSSC device is notably better than other reported symmetrical/asymmetrical SCs based on graphene SCs (2.8-136 Wh/kg), MnO$_2$ nanowires/graphene based SCs (30.4 Wh/kg), activated carbon based SCs (<10 Wh/kg), carbon nanotube sheet/MnOx composite, ionic liquid/Co(OH)$^2$ nanohybrids (37.6 Wh/kg), amorphous Ni(OH)$_2$ nanospheres (12.6 Wh/kg), Ni(OH)$_2$ nanosheets/Ni foam (82.7 Wh/kg), 48 Ni-Co LDH nanosheets//RGO (188 Wh/kg), and other SCs. Moreover, the cycle life of the FSSC was measured at 25 mV/s. Experiment results show that an FSSC device still has nearly 85% of its original Csp value after 5000 cycles.

In conclusion, a simple, scalable and cheap conductive paper electrode is assembled by applying the carbon powder layer, the graphite layer, the nanostructural layer and the energy storage layer onto paper. The conductive paper electrode is advantageous due to its thinness, light weight, and flexibility. The electrochemical capacitor shows a great Csp (380 F/g at 5 mV/s), a high energy density of between 120 W h/kg and 300 W h/kg, a high voltage of between 2V and 4V, and an excellent cycle-stability (less than 15% loss of Csp after 5000 cycles). The electrolyte is stable at room temperature and is not sensitive to water, and thus the electrochemical capacitor can be prepared at room temperature and in a water-containing environment, which reduces manufacturing costs and simplifies processes. The electrolyte/electrode system can be assembled to a quasi-ionic liquid electrolyte and hybrid paper electrode system, which will be prospective for many flexible and wearable applications such as batteries, fuel cells, wearable/roll-up displays, electronic papers, touch panels, mobile phones, sensor networks, hand-held portable devices and artificial electronic skin.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same or equal if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" parallel can refer to a range of angular variation relative to 0° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°. For example, "substantially" perpendicular can refer to a range of angular variation relative to 90° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A conductive paper electrode, comprising:
a paper;
a carbon powder layer over the paper;
a graphite layer over the carbon powder layer;
a nanostructural layer over the graphite layer; and
an electrolyte over the nanostructural layer,
wherein the electrolyte comprises a lithium-containing quasi-ionic liquid and a gel, and a weight ratio of the lithium-containing quasi-ionic liquid to the gel is between about 1:4.5 and about 4:1.

2. The conductive paper electrode of claim 1, wherein the carbon powder layer includes a photo-printed carbon powder layer.

3. The conductive paper electrode of claim 1, wherein the graphite layer includes a textured surface.

4. The conductive paper electrode of claim 1, wherein the nanostructural layer comprises a plurality of conductive nanotubes.

5. The conductive paper electrode of claim 1, wherein the nanostructural layer comprises a nickel layer.

6. The conductive paper electrode of claim 1, further comprising an energy storage layer over the nanostructural layer.

7. The conductive paper electrode of claim 6, wherein a material of the energy storage layer comprises a metal oxide or a conductive polymer.

8. The conductive paper electrode of claim 7, wherein the metal oxide comprises manganese oxide, cobalt oxide, nickel oxide, vanadium oxide, or a combination thereof.

9. The conductive paper electrode of claim 7, wherein the conductive polymer comprises Polypyrrole (PPy), Poly(3, 4-ethylenedioxythiophene) (PEDOT), Polyaniline (PANI), or a combination thereof.

10. The conductive paper electrode of claim 1, wherein the conductive paper electrode is flexible.

11. An electrochemical capacitor, comprising:
two conductive paper electrodes, each of the conductive paper electrodes comprising:
a paper;
a carbon powder layer over the paper;
a graphite layer over the carbon powder layer;
an energy storage layer on the conductive nanostructures; and
an electrolyte interposed between the energy storage layers of the conductive paper electrodes,
wherein the electrolyte comprises a lithium-containing quasi-ionic liquid and a gel, and a weight ratio of the lithium-containing quasi-ionic liquid to the gel is between about 1:4.5 and about 4:1.

12. The electrochemical capacitor of claim 11, wherein the electrolyte comprises:
a lithium-containing quasi-ionic liquid, comprising:
an organic compound having at least one acylamino group; and
a lithium salt.

13. The electrochemical capacitor of claim 12, wherein the organic compound comprises acetamide, urea, methylurea (NMU), 2-oxazolidinone (OZO), ethyleneurea, 1,3-dimethylurea DMU or a combination thereof, the lithium salt is characterized as LiX, wherein X comprises ClO4-, SCN—, PF6-, B(C2O4)2-, N(SO2CF3)2-, CF3SO3- or a combination thereof.

14. The electrochemical capacitor of claim 12, wherein the gel comprises polyvinyl alcohol (PVA).

15. The conductive paper electrode of claim 1 wherein the gel comprises polyvinyl alcohol (PVA).

16. An electrochemical capacitor, comprising:
two conductive paper electrodes of claim 1, each of the conductive paper electrodes further comprising an energy storage layer on the conductive nanostructures; and
an electrolyte interposed between the energy storage layers of the conductive paper electrodes,
wherein the electrolyte comprises a gel, and the gel comprises polyvinyl alcohol (PVA).

* * * * *